(12) United States Patent
Inagaki et al.

(10) Patent No.: US 8,386,720 B2
(45) Date of Patent: Feb. 26, 2013

(54) METHOD FOR ALLOWING EXCLUSIVE ACCESS TO SHARED DATA

(75) Inventors: Tatsushi Inagaki, Kanagawa-ken (JP); Takuya Nakaike, Kanagawa-ken (JP); Takeshi Ogasawara, Tokyo (JP); Toshio Suganuma, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 12/553,166

(22) Filed: Sep. 3, 2009

(65) Prior Publication Data

US 2010/0088476 A1 Apr. 8, 2010

(30) Foreign Application Priority Data

Sep. 5, 2008 (JP) ................................. 2008-228286

(51) Int. Cl.
*G06F 12/14* (2006.01)
(52) U.S. Cl. ................. 711/152; 711/170; 711/E12.001
(58) Field of Classification Search .................... 711/152
See application file for complete search history.

(56) References Cited

U.S. PATENT DOCUMENTS

2010/0100690 A1* 4/2010 Rajamani et al. ............. 711/152

OTHER PUBLICATIONS

Brian Goetz, "Optimistic Thread Concurrency: Breaking the Scale Barrier," Azul Systems, pp. 1-11, Jan. 2006.

* cited by examiner

*Primary Examiner* — Kenneth Lo
(74) *Attorney, Agent, or Firm* — Scully, Scott, Murphy & Presser, P.C; Preston Young, Esq.

(57) ABSTRACT

A method of allowing exclusive access to shared data by a computing device and a computer readable article embodying instructions for executing the method. The method includes: reading from a storage unit into a memory a program including a code for execution in a critical section and an instruction to write a value into or read a value from a shared data area in the memory; acquiring a lock on the critical section before start of a first instruction in the critical section; writing a value into a thread-local area in the memory in response to an instruction to write the value into the shared data area; writing into the shared data area the value written into the thread-local area upon completion of a final instruction in the critical section; and releasing the lock on the critical section, thereby allowing exclusive access to shared data.

14 Claims, 18 Drawing Sheets

| Version Number | Lock Bit |
|---|---|
| 100 | 0 |
| 65 | 0 |
| 11 | 0 |
| 37 | 0 |
| 890 | 0 |
| ⋮ | ⋮ |
| 7 | 0 |
| 495 | 0 |

Owner Record Table

FIG. 3C

| External Critical Section | Internal Critical Section | Whether Allowable Or Unallowable |
|---|---|---|
| Lock Mode | Lock Mode | Allowable |
| Lock Mode | Transaction Mode | Allowable |
| Lock Mode | Dummy Transaction Mode | Allowable |
| Transaction Mode | Lock Mode | Unallowable |
| Transaction Mode | Transaction Mode | Allowable |
| Transaction Mode | Transaction Mode | Unallowable |
| Dummy Transaction Mode | Lock Mode | Unallowable |
| Dummy Transaction Mode | Transaction Mode | Allowable |
| Dummy Transaction Mode | Dummy Transaction Mode | Allowable |

FIG. 4B

```
public class object{
final static int LOCK_MODE =1;      // LOCK MODE
final static int TM_MODE =2;        // TRANSACTION MODE
final static int DUMMT_TM_MODE =3;  // DUMMY TRANSACTION MODE
// DATA NECESSARY FOR MONITOR OBJECT
ReentrantLock mutex = new ReentrantLock90; //LOCK VARIABLE
Condition noActiveTx = mutex.newCondition(); OBJECT FOR MONITORING ENDING OF TRANSACTIONS int mode = TM_MODE; // CURRENT EXECUTION MODE
int active = 0; // NUMBER OF CURRENTLY ACTIVE TRANSACTIONS
//STATISTICAL DATA ABOUT MONITOR OBJECT: USE FOR SELECTING EXECUTION MODE
int abortedTxCount = 0; // NUMBER OF TRANSACTIONS FOR WHICH COMMIT IS UNSUCCESSFUL
int totalTxCount; = 0; // TOTAL NUMBER OF TRANSACTIONS EXECUTED WITH THIS OBJECT SET AS MONITOR
int parallelTxCount = 0; // TOTAL NUMBER OF TRANSACTIONS EXECUTED IN PARALLEL
int totalLockCount = 0; // TOTAL NUMBER OF TIMES OF EXECUTION IN LOCK MODE
int unrevocableCount = 0; // NUMBER OF TIMES PROCESSING WHICH CANNOT BE ROLLED BACK IS ENCOUNTERED
int lockContentionsCount = 0; // NUMBER OF LOCK CONTENTIONS
``` fig. 5d

```
// "TRUE" IS PASSED WHEN RE-EXECUTED BY PROCESSING WHICH CANNOT BE ROLLED BACK
public void enter(boolean mustBeChangedIntoLockMode) {
  if (mutex.tryLock()) { // TRY ACQUISITION OF LOCK ONLY ONCE
    // LOCK ACQUISITION IS UNSUCCESSFUL
    mutex.lock(); //WAIT UNTIL LOCK IS ACQUIRED
  }
  // SELECT APPROPRIATE EXECUTION MODE
  int nextMode = mustBeChangedIntoLockMode? LOCK_MODE : selectMode();
  if (mode != nextMode) { // CHANGE EXECUTION MODE
    if (mode == TM_MODE) {
      // IF CURRENT MODE IS TRANSACTION MODE,
      // WAIT UNTIL ALL TRANSACTIONS ARE COMPLETED CONDITIONAL WAIT
      while(true) {
        if (activeTxCount.intValue() !=0)
          noActiveTx.await(); // CONDITIONAL WAIT
      }
      mode = nextmose; // TRANSACTION MODE ≥ LOCK MODE OR DUMMY TRANSACTION MODE
    } else {
      mode = nextmode; // LOCK MODE OR DUMMY TRANSACTION MODE ≥ TRANSACTION MODE
    }
  }
  // COMPLETION OF CHANGING EXECUTION MODE
  if (mode == TM_MODE) {
    // INCREMENT NUMBER OF TRANSACTIONS
    parallelTxCount += (activeTxCount++);
    totalTxCount++;
    mutex.unlock(); // RELEASE LOCK
    tmBegin(mode); // START TRANSACTION WITH LOCK BEING RETAINED
  } else {
    totalLockCount++;
  }
}
```

FIG. 5E

```
public void exit() {
if (mode == TM_MODE) { // TRANSACTION MODE
    mutex.lock();
    activeTxCount--; // DECREMENT NUMBER OF TRANSACTIONS
    if (!tmEnd()) {
        // COMMIT FOR TRANSACTION IS UNSECCESSFUL
        abort(); // ROLL BACK TRANSACTION
        abortedTxCount++;
        noActiveTx.signal(); // NOTIFY OF CHANGE IN NUMBER OF TRANSACTIONS
        mutex.unlock();
        throw new TransactionAbortedException(); // RETURN TO WHERE TRANSACTION IS BEGUN
    }
    // COMMIT FOR TRANSACTION IS SUCCESSFUL
    noActiveTx.signal(); // NOTIFY OF CHANGE IN NUMBER OF TRANSACTIONS
    mutex.unlock();
} else if (mode == DUMMY_TM_MODE) { // DUMMY TRANSACTION MODE
    if (!tmEnd()) {
        // COMMIT FOR TRANSACTION IS UNSUCCESSFUL
        abort(); // ROLL BACK TRANSACTION
        mutex.unlock(); // RELEASE LOCK
        THROW NEW tRANSACTIONaBORTEdeXCEPTION();
    }
    // COMMIT FOR TRANSACTION IS SUCCESSFUL
    mutex.unlock(); // RELEASE LOCK
} else { // LOCK MODE
    mutex.unlock();
}
}
```

FIG. 5F

```
public void interrupted() {
if (mode == TM_MODE) { // TRANSACTION MODE
abort(); // ROLL BACK TRANSACTION
mutex.lock();
activeTxCount--; // DECREMENT NUMBER OF TRANSACTIONS
noActiveTx.signalAll();
throw newSafelynterruptedException(); // STOP THREAD
} else if (mode == DUMMY_TM_MODE) { // DUMMY TRANSACTION MODE
abort(); // ROLL BACK TRANSACTION
mutex.unlock();
throw newSafelynterruptedException(); // STOP THREAD
} else if (mode == LOCK_MODE) { //LOCK MODE
    // UNABLE TO STOP THREAD
}
}
```

FIG. 5G

METHOD FOR ALLOWING EXCLUSIVE ACCESS TO SHARED DATA

CROSS-REFERENCE TO RELATED APPLICATION

This application claims priority under 35 U.S.C. §119 from Japanese Patent Application No. 2008-228286 filed on Sep. 5, 2008, the entire contents of which are incorporated herein by reference.

BACKGROUND OF THE INVENTION

1. Field of the Invention

The present invention relates to a computer system, method and computer-readable article of manufacture for accessing shared data. More particularly, the present invention relates to allowing exclusive access to shared data.

2. Description of Related Art

A critical section of a computer is a section in a computer in which simultaneous performance of multiple processes using a single resource would lead to crash. In the critical section, atomicity needs to be secured by a measure such as performing exclusive control. In such exclusive control, a lock is used, for example. However, exclusive control using a lock poses a problem in that processing cannot be stopped in the middle in a critical section.

Such a critical section is, for example, a synchronized block in Java™. Java™ supports multi-thread programs at the language level. Java™ provides java.lang.Thread.interrupt as an application program interface (API) for asynchronously stopping a thread. Here, "to stop a thread" means to bring execution of the thread back to a certain part of a program, or to end execution of the thread. However, the above API cannot stop any thread other than a thread monitored for its interruption by use of the java.lang.Thread.interrupted method, and threads having been in a waiting state by calling java.lang.Object.wait, java.lang.Thread.join and java.lang.Thread.sleep. Even when such a thread is successfully stopped, if the thread is stopped in the middle of accessing shared data in a synchronized block which is a critical section in Java™, the shared data is left half-finished. This can lead to a condition where execution of other threads referring to the shared data is uncertain. To prevent this, if a thread is stopped, shared data needs to be returned to a state before execution of the synchronized block. However, it is unrealistic for a program to grasp all the updates of shared data in the synchronized block and to add a rollback process to each point where a thread is to be stopped.

Realtime Java™ provides javax.realtime.RealtimeThread.interrupt as an API for asynchronously stopping a thread. When this API is called, an asynchronous-event flag is set on a thread. An asynchronous-event checking code, which is automatically inserted in a byte code and in a just-in-time (JIT) compile code, is executed in each thread. By the execution of the asynchronous-event checking code, the presence or absence of an asynchronous event is checked. If there is a thread confirmed to have a flag set for it, an exception is thrown from this confirmed thread. Then, execution of this confirmed thread is brought back to a certain part of a program or is ended. However, an exception is not necessarily thrown in a synchronized block. This is because shared data cannot be returned to a state before execution of the synchronized block.

Because shared data protected by a synchronized block cannot be returned to a state before execution of the synchronized block in the conventional techniques, a thread cannot be stopped in a synchronized block.

There are examples of execution schemes for a critical section as alternatives to the above exclusive control schemes using a lock. A transactional memory scheme is employed in each of Non-patent Documents (1), Adam Welc, Antony L. Hosking and Suresh Jagannathan, "Transparently Reconciling Transactions with Locking for Java Synchronization," ECOOP '06, Springer-Verlag Berlin Heidelberg, pp. 148-173, 2006, and (2) Brian Goetz, "Optimistic Thread Concurrency: Breaking the Scale Barrier," AZUL SYSTEMS, pp. 1-11, January 2006. In the transactional memory scheme, a synchronized block is executed as a transaction. In Non-patent Documents (1) and (2), however, only a synchronized block in which a large number of lock contentions occur is executed as a transaction. This is because, if a synchronized block in which no or few lock contentions occur is executed as a transaction, this can lead to performance degradation as a result of the overhead of logging. Additionally, in Non-patent Documents (1) and (2), there is no mention of stopping a thread in a synchronized block. Further, Non-patent Documents (1) and (2) propose switching an execution scheme of a synchronized block between an exclusive control scheme and a transaction scheme.

SUMMARY OF THE INVENTION

Large-scale middleware used by Web servers can process a large number of requests by multiple threads. To maintain integrity of data accessed by the multiple threads, exclusive control using a lock is used. In a state where a lock on a thread is acquired, if a thread is stopped while a lock on the thread has been acquired, integrity of the data cannot be maintained. Thus, when it is desired to stop only a locked thread, the entire middleware must be stopped. For this reason, there is a need for a mechanism to allow a thread to stop only when another thread has failed or is considered to have failed without stopping the entire middleware.

According to an aspect of the present invention, there is provided a method of allowing exclusive access to shared data by a computing device. The method includes the steps of: reading, by a read data module, from a storage unit into a memory, a program including a code for execution in a critical section and an instruction to write a value into or read a value from a shared data area in the memory; acquiring, by an acquire lock module, a lock on the critical section before start of a first instruction in the critical section; writing, by a write data module, a value into a thread-local area in the memory in response to a write instruction to write the value into the shared data area in the critical section; writing, by the write data module, into the shared data area, the value written into the thread-local area, upon completion of a final instruction in the critical section; and releasing, by a release lock module, the lock on the critical section, thereby allowing exclusive access to shared data.

According to yet another aspect, the present invention provides a method of causing transitions among modes by a computing device for allowing exclusive access to shared data in order to allow stopping of a program including a code for execution in a critical section and an instruction to write a value into or read a value from a shared data area in a memory. The method Includes at least one of the steps of: causing a transition from a transaction mode to a quasi-transaction mode; causing a transition from the quasi-transaction mode to a lock mode; and causing a transition from the quasi-transaction mode to the transaction mode, where the lock mode is a mode for executing a critical section by using a lock.

The transaction mode is a mode for executing a critical section by using a transactional memory scheme, and the quasi-transaction mode is a mode for executing a critical section by executing the steps of acquiring, by an acquire lock module, a lock on the critical section before start of a first instruction in the critical section, writing, by a write data module, a value into a thread-local area in the memory in response to a write instruction to write the value into the shared data area in the critical section, writing, by the write data module, into the shared data area, the value written into the thread-local area, upon completion of a final instruction in the critical section, and releasing, by a release lock module, the lock on the critical section, thereby causing transitions among modes for allowing exclusive access to shared data in order to allow stopping of the program including the code for execution in the critical section and the instruction to write the value into or read the value from the shared data area in the memory.

According to still another aspect, the present invention provides a computer readable article of manufacture tangibly embodying computer readable instructions for executing a computer implemented method of allowing exclusive access to shared data.

BRIEF DESCRIPTION OF THE DRAWINGS

For a more complete understanding of the present invention and its advantages, reference is now made to the following description taken in conjunction with the accompanying drawings. Below, the embodiments of the present invention will be described in accordance with the drawings. It should be noted that these descriptions are provided to describe suitable embodiment of the present invention, and are not intended to limit the scope of the present invention to those shown here. Additionally, the same reference numerals denote the same elements throughout the drawings unless otherwise stated.

FIG. 3C shows an example of an ownership record table.

FIG. 4B shows allowable execution modes in an inner critical section for each of the execution modes in an outer critical section in a case where the critical sections are nested, according to an embodiment of the present invention.

FIG. 5D shows an example of a data structure of a monitor object needed in a Java™ execution environment, according to an embodiment of the present invention.

FIG. 5E shows an example of a program for processing executed before the first instruction in a critical section is started, according to an embodiment of the present invention.

FIG. 5F shows an example of a program for processing executed after the final instruction in a critical section is completed, according to an embodiment of the present invention.

FIG. 5G shows an example of a program for processing for a case where a thread stops upon acceptance of an asynchronous event during execution of an instruction in a critical section, according to an embodiment of the present invention.

DETAILED DESCRIPTION OF THE PREFERRED EMBODIMENTS

Figure 1:
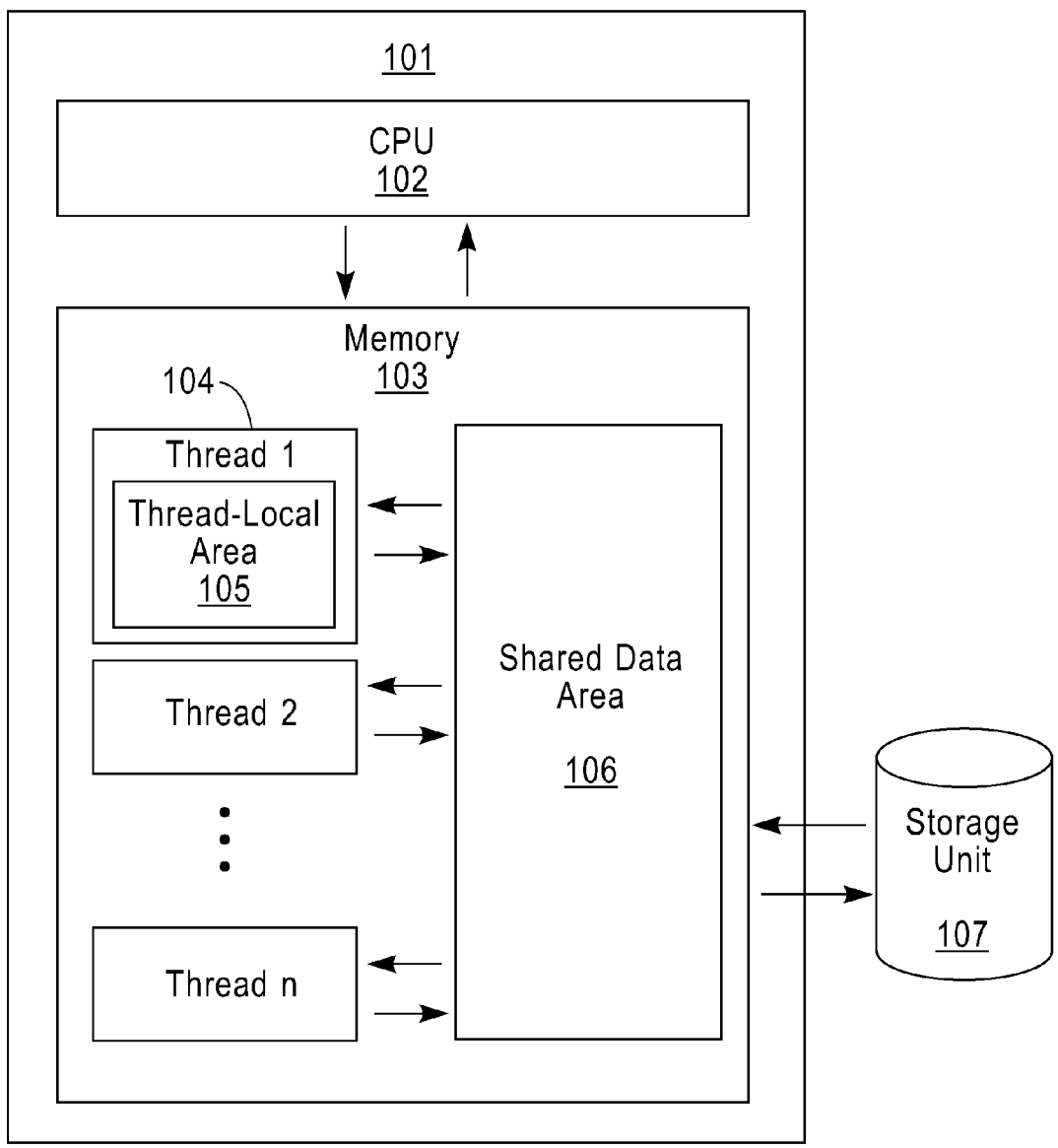
FIG. 1 shows an example of a system configuration according to an embodiment of the present invention.

In embodiments of the present invention, it is assumed that multiple single-threaded environments are used or that a multi-threaded environment is used is premised. A thread is a processing unit of a program. In the embodiments of the present invention, a thread is a thread capable of executing a critical section for accessing shared data to be changed, among multiple threads.

"Single-threaded" here defines an environment or method where certain processing is operated by use of only one thread. The case where multiple single-threaded environments are used is a case where multiple central processing units (CPUs) make up each single-threaded environment. In a single-threaded environment, one critical section is controlled by only one CPU. In the case where multiple single-threaded environments are used, shared data is stored in a storage unit accessible from the CPUs.

"Multi-threaded" means that multiple processing is performed in parallel by generating multiple threads. In a multi-threaded environment, multiple processing appears to be simultaneously executed. Actually, the processing time of a CPU is divided into short units of time. The short units of time are sequentially allocated to multiple threads, where the processing is made to appear to be simultaneously executed. In a multi-threaded environment, a memory space can be shared. In the multi-threaded environment, one critical section is controlled by only one thread. Additionally, in the multi-threaded environment, a shared memory is accessible from multiple threads.

In the embodiment of the present invention, a "critical section" refers to a module in a computer, which breaks down when multiple processing are simultaneously executed over a single resource. In the critical section, it is necessary to secure atomicity by performing exclusive control. The critical section includes an instruction to write a value in a shared data area, or an instruction to read a value from it. The shared data area is located at a specified address in a memory area. Examples of programs including a critical section include Java™, C++ and C#, but are not limited to these examples.

An example of code for the critical section include a synchronized block of Java™, but is not limited to this. Normally, the synchronized block is controlled only by one thread at the most. That is, when a certain thread is accessing the synchronized block, another thread cannot additionally access the synchronized block. However, by employing the present invention, the synchronized block can be controlled by multiple threads.

In the embodiments of the present invention, "shared data" is data accessed in accordance with an instruction in the critical section. This data can be commonly accessed by multiple threads. Additionally, it is necessary that a change in this data be performed collectively per critical section. In the embodiments of the present invention, the shared data can be stored in the shared data area in a memory, or stored in a predetermined storage unit.

In the embodiments of the present invention, a "shared data area" is an area in which the shared data is stored. The shared data area can be accessed by multiple threads. In the embodiments of the present invention, a "thread-local area" is an area which each thread has in a memory. A "thread-local area" is accessible only from a thread which has this area.

In the embodiments of the present invention, "exclusive access to shared data" is access performed so as to exclusively utilize the shared data. In the embodiments of the present invention, shared data currently being accessed by an instruction included in a critical section is not accessed by any other processing until the processing of this critical section is completed.

In the embodiments of the present invention, to "acquire a lock on a critical section" is to acquire a lock on the critical section so as to start an access restriction to the critical section in an environment where there are multiple threads.

In the embodiments of the present invention, to "release a lock on a critical section" is to release a lock on the critical section so as to end the above access restriction to the critical section in an environment where there are multiple threads.

Once a lock on a critical section is acquired in a certain thread, any other threads cannot access the critical section until the lock on the critical section is released. Consequently, instructions to access a shared data area, which are included in the critical section, are not simultaneously executed from multiple threads as long as the lock on the critical section has been acquired.

In the embodiments of the present invention, an "asynchronous event" is an event exchanged at any timing without having an issuer and receiver of the event coincident in time. An event is any action performed on a currently executing thread from the outside. This action is, for example, an instruction to stop a currently executing thread, where the instruction is issued from another thread.

Many of Java™ executing environments are provided with an asynchronous-event processing mechanism. An intended purpose of a typical asynchronous-event processing mechanism is a stop-the-world operation at the time of garbage collection for collecting an unnecessary object. In Java™, when a heap memory area for producing an object becomes insufficient in a thread, garbage collection is requested. By this request, a heap memory area for producing an object is expected to be saved for that one thread.

The stop-the-world operation is processing in which execution of all the threads is halted so as to prevent access to an object which is moved or whose address is changed by the garbage collection. In the thread for which the garbage collection is requested, asynchronous-event flags in the other threads are set for the stop-the-world operation to be performed. At an asynchronous event checkpoint of each thread, presence or absence of an asynchronous event is checked. The asynchronous event checkpoint is provided at an entry of a method, a back edge of a loop, for example. In a thread in which an asynchronous flag has been detected, the type of the event is indentified, and processing according to the event is executed. If the type of the asynchronous event is stop-the-world, execution of a program is halted, and ending of the garbage collection is suspended. A method of this suspension, for example, is the execution of a loop for checking the flag indicating the ending of the garbage collection.

In the embodiments of the present invention, a thread is stopped by using the above asynchronous event processing mechanism. For an instruction requesting to stop a thread, a flag indicating an occurrence of an asynchronous event is set in each thread targeted to be stopped. In the thread to be stopped, processing for the stopping is performed if a thread stopping event is detected at the asynchronous event checkpoint. The stopping processing, for example, throws an exception. By this throwing, execution of a program is brought back to a point where an exception is caught. In this example, it is necessary for a programmer to write a code for catching an exception. Additionally, if there is no point where an exception is caught, a user is notified that the exception is thrown, and the stop target thread ceases to exist.

A transactional memory scheme is a technique guaranteeing that a transaction is safely executed without losing data integrity. The transactional memory scheme is normally implemented in a lock-free manner. A transaction is a code for executing a series of read and write operations over a shared data area. Theoretically, this series of read and write operations is executed at one certain point in time. From other transactions, the state of operation during this execution cannot be seen.

In the transactional memory scheme, a thread completes a change in the shared data area without changing the state of the other threads. Instead of holding the writing side accountable for keeping the other ongoing operations unaffected, the thread holds the reading side accountable. After the whole transaction is completed, the thread causes the reading side to verify whether the memory targeted to be accessed has been changed in parallel by other threads. If the verification has confirmed that the change is correct, the change is reflected as a permanent one. This processing is called "commit." Additionally, a transaction can be stopped at any time on the grounds that priority has changed as a result of rollback of or cancellation of processing. If commit cannot be performed as a result of contention for the change of a transaction, normally the transaction is stopped and repeated from the start until it is successful.

FIG. 1 shows an example of a system configuration according to an embodiment of the present invention. A computer 101 includes a CPU 102 and a memory 103. The computer 101 may use a transactional memory scheme system.

The memory 103 retains threads 104 and a shared data area 106. There may be one or multiple threads 104. If there is only one thread 104, this one thread 104 constitutes multiple threads when taken together with threads in computers other than the computer 101. Each of the threads 104 retains a thread-local area 105. The thread-local area 105 is accessed only by a program executed by one of the threads 104 that contains the thread-local area 105. The shared data area 106 can be accessed by programs executed by any threads. A storage unit 107 contains a program including the code for a critical section.

Shared data can be retained in any one of or both of the shared data area 106 and the storage unit 107. The CPU 102 reads a program from the storage unit 107 into the memory 103 and executes the program. Before the first instruction in a critical section of the program is started, the CPU 102 acquires a lock on the critical section. In response to an instruction in the critical section that requests the writing of shared data, the CPU 102 writes the shared data into the thread-local area 105 instead of writing it into either the shared data area 106 or the storage unit 107. Upon completion of the last instruction in the critical section, the CPU 102 acquires a value written from the thread-local area 105. The CPU 102 writes the value into either the shared data area 106 or the storage unit 107. Upon completion of writing, the CPU 102 releases the lock on the critical section.

In the embodiment of the present invention, any one of the following three different execution modes is set with respect to an object generated from code including a critical section of the code. The object is, for example, a monitor object in a Java™ execution environment. The execution modes are a lock mode, a transaction mode and a quasi-transaction mode. The lock mode is a mode for performing exclusive control using a lock, where a lock on a critical section is acquired. The transaction mode is a mode for executing a critical section according to a transactional memory scheme. The quasi-transaction mode is a mode for executing a critical section according to the transactional memory scheme at the same time as performing exclusive control using a lock and writing the shared data.

The transaction mode is set with respect to an object executing a critical section whose synchronous execution is advantageous. The quasi-transaction mode is set with respect to an object executing a critical section whose synchronous execution is not advantageous. The lock mode is set with respect to an object executing a critical section which is not, or cannot be, executed in the transaction mode and in the quasi-transaction mode.

In each of the above objects, the critical section is executed with the set mode. Consequently, when the same object is being used in different critical sections, these critical sections are executed using the same mode. Alternatively, it is possible that the same critical section is executed in different modes if different objects are executing it.

Figure 2A:
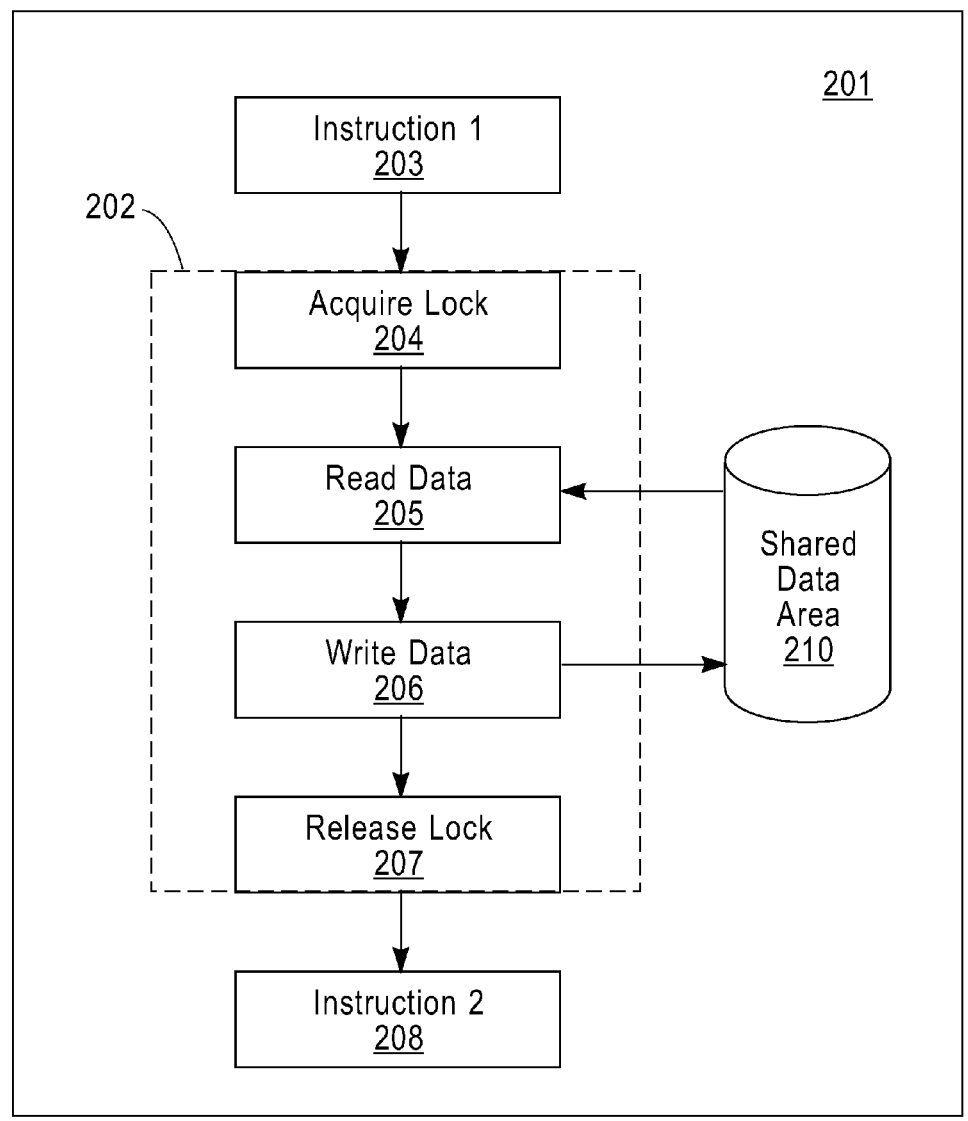
FIG. 2A shows an example of a lock mode.

FIG. 2A shows an example of the lock mode. In the lock mode, a lock on a critical section is acquired before the first instruction in the critical section of the program is started, and then the lock on the critical section is released upon completion of the last instruction in the critical section. In the lock mode, exclusive control in the critical section over access to shared data is performed. The lock mode is, for example, a scheme for acquiring a lock on a synchronized block in Java™.

In a thread 201, the processes of modules 203 to 208 are sequentially executed. The part of FIG. 2A enclosed by a broken line 202 corresponds to processing in a critical section. In this critical section, the Acquire Lock module 204 acquires a lock on the critical section. The lock on the critical section is released by the Release Lock module in the last module 207. With the lock on the critical section, the Read Data module 205 reads shared data from the shared data area 210. The Write Data module 206 writes data into the shared data area 210. Reading and writing are executed exclusively by the respective modules.

In the lock mode, the thread 201 cannot be stopped while the functions of the modules 205 to 207 in the critical section are being executed. In order to stop the thread 201 and preserve the atomicity of the critical section at the same time, the contents of the shared data have to be returned to their state before the critical section is executed. However, for example, in a case where writing the data has been already executed, there is no information retained for cancelling the writing.

Figure 2B:
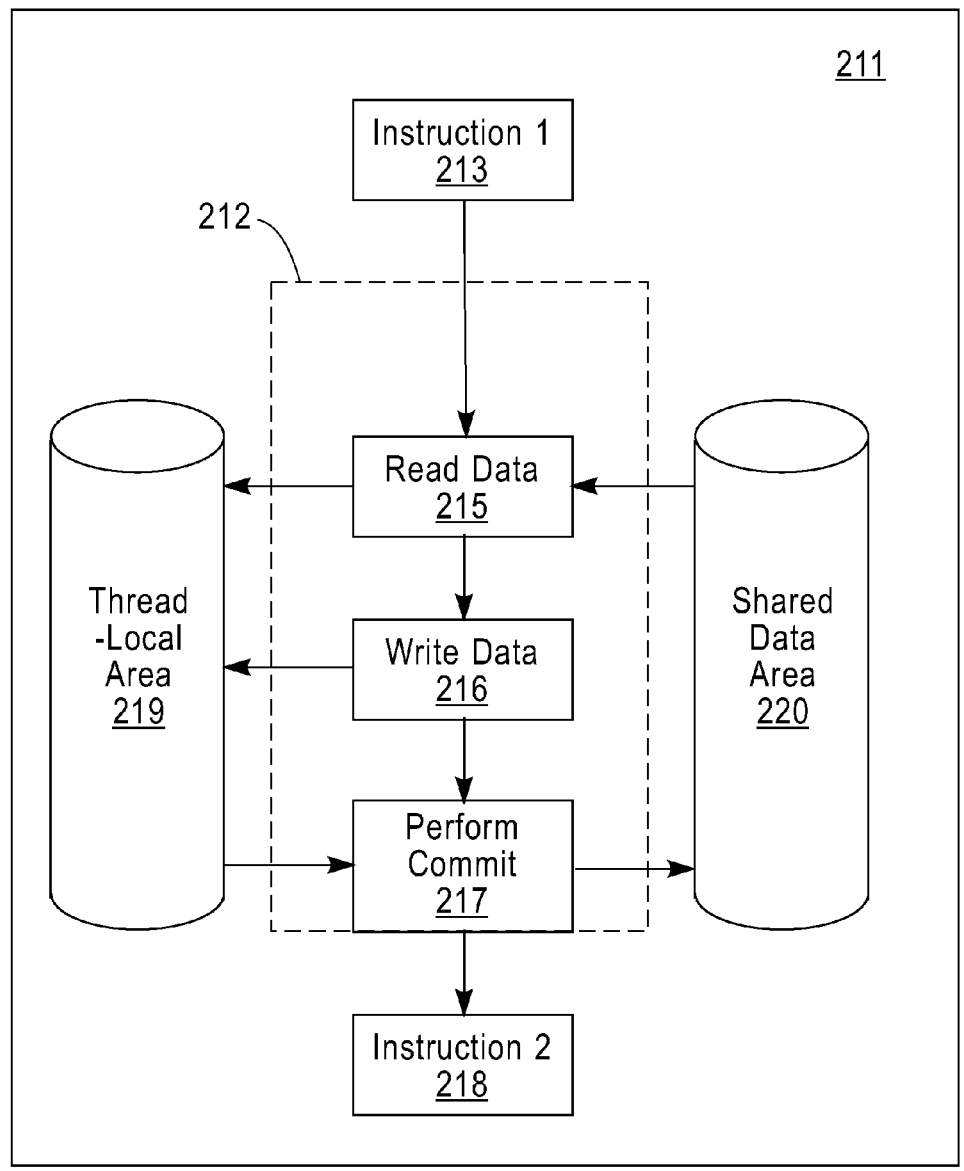
FIG. 2B shows an example of a transaction mode.

FIG. 2B shows an example of the transaction mode. In the transaction mode, a lock on a critical section is not acquired. In this mode, access to the shared data is performed upon completion of the last instruction in the critical section, and a change in the shared data becomes invisible until the end of a transaction. In the transaction mode, for example, a synchronized block is executed according to a transactional memory scheme in Java™.

In a thread 211, the functions of modules 213 and 215 to 218 are sequentially executed. The part of FIG. 2B enclosed by a broken line 212 corresponds to processing in a critical section. In the Read Data module 215 reading shared data from a shared data area 220 is performed and an address for accessing a value to be read is stored in a thread-local area 219. Moreover, read information associated with the shared data is recorded in the thread-local area 219. This read information is, for example, a version number. This version number is a value incremented every time the shared data is updated. Additionally, in the Write Data module 216 for writing data into the shared data, the writing is not executed directly into the shared data area, and, instead of this, a value to be written and an address for accessing an area into which the value is written are stored in the thread-local area 219.

Reading and writing of the shared data are collectively executed by the Perform Commit module 217 where processing performed at the end of the critical section execution. At the execution of these read and write steps, the version number stored in the thread-local area 219 is compared with the version number at the execution of the commit performed in Perform Commit module 217. As a result of the comparison, the shared data is updated if the version numbers match each other. The processing in the critical section is re-executed if the version numbers do not match each other.

In the transaction mode, a critical section is executed with the start of the critical section as a start of a transaction, and with the end of the critical section as an end of the transaction. By this execution, regardless of when the thread 211 that executes this critical section is stopped, a change of the shared data protected by the critical section becomes invisible to other threads which execute other critical sections. Additionally, the change can be cancelled by rolling back the transaction. Consequently, the atomicity of the critical section is preserved, by which it is possible to stop the thread 211.

Figure 3A:
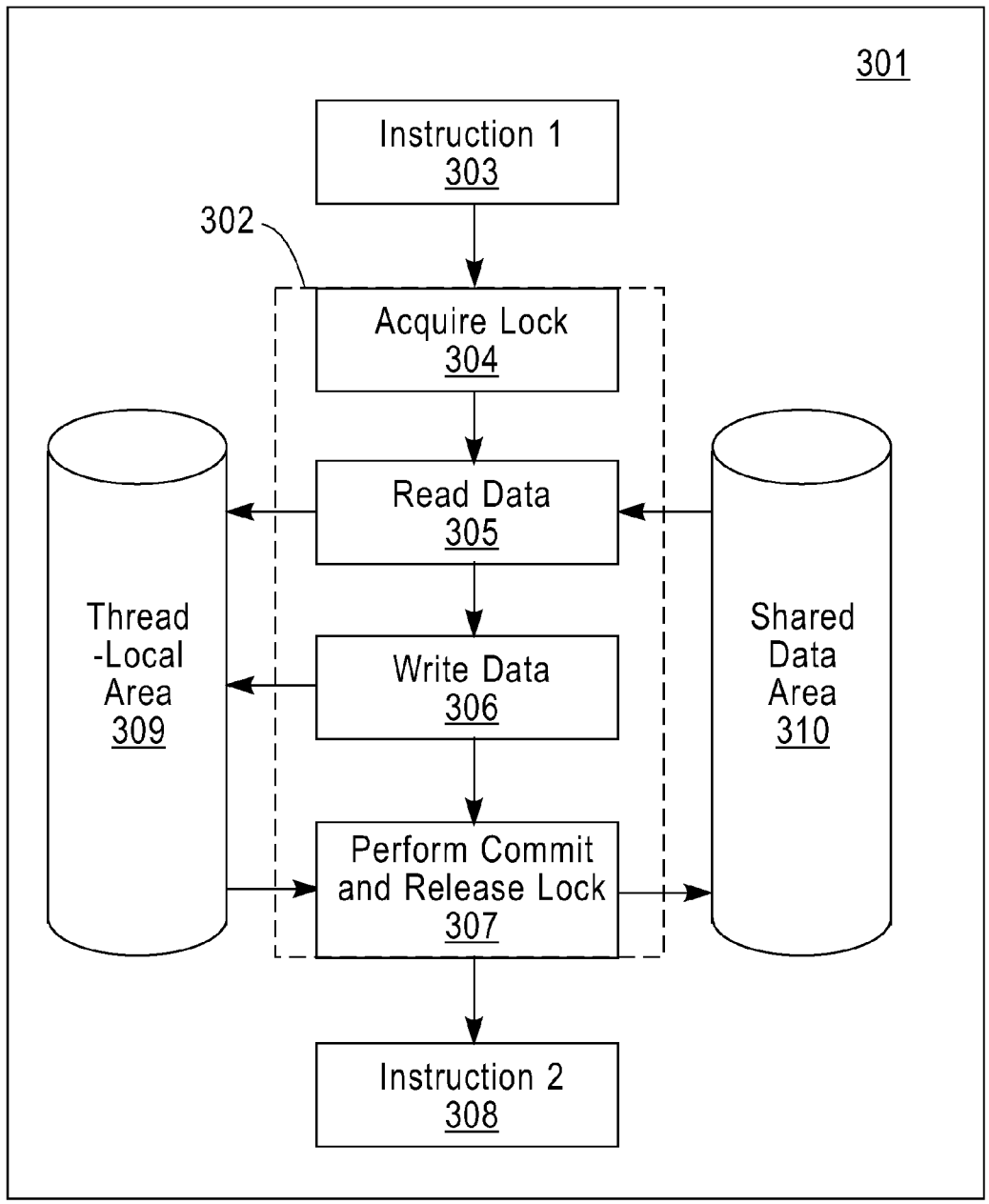
FIG. 3A shows an example of a quasi-transaction mode according to an embodiment of the present invention.

FIG. 3A shows an example of the quasi-transaction mode of an embodiment of the present invention. In the quasi-transaction mode, a lock on a critical section is acquired before the first instruction in the critical section is started. The lock on the critical section is released upon completion of the last instruction in the critical section.

In the quasi-transaction mode, access to shared data is performed upon completion of the final instruction in the critical section, and a change of the shared data becomes invisible until a transaction ends. Additionally, in the quasi-transaction mode, exclusive access to the shared data is provided to one thread, where this shared data cannot be accessed by the other threads until the lock on the critical section is released.

In the quasi-transaction mode, for example, in Java™, a lock on a synchronized block is acquired, and the synchronized block is executed by the transactional memory scheme.

In a thread 301, the functions of the modules 303 to 308 are sequentially executed. The part of FIG. 3A enclosed by a broken line 302 corresponds to processing in a critical section. A lock on this critical section is acquired in the first module, the Acquire Lock module 304, of the critical section, and the lock on this critical section is released in the last module, the Perform Commit and Release Lock module, 307. With the lock on the critical section, the Read Data module 305 for reading shared data from a shared data area 310 and the Write Data module 306 for writing data into a shared data area 310 execute their functions exclusively. In the Read Data module 305 for reading the shared data from the shared data area 310, an address for accessing a value to be read is stored in the thread-local area 309.

Here, there is no need for read information associated with the shared data to be recorded in the thread-local area 309. Additionally, in the Write Data module 306 for writing data into the shared data, the writing is not executed directly into the shared data area, but instead a value to be written and an address for accessing an area into which the value is written are stored in the thread-local area 309. Read and write of the shared data are collectively executed in the Perform Commit and Release Lock module 307. This process is performed at the end of the execution of the critical section.

In the quasi-transaction mode, a critical section is executed with the start of the critical section as the start of a transaction, and with the end of the critical section as the end of the transaction. By this execution, regardless of when the thread 301 that executes this critical section is stopped, a change of the shared data protected by this critical section becomes invisible to other threads which execute other critical sections. Additionally, the change can be cancelled by rolling back the transaction. Consequently, the atomicity of the critical section is preserved, and the thread 301 can be stopped.

By introducing the quasi-transaction mode, overhead of logging processing in a transactional memory scheme system is reduced. This is because, whereas read from and write into shared data are recorded in the transactional memory scheme, only write into shared data is recorded and read from shared data is not recorded in the quasi-transaction mode. Additionally, in the quasi-transaction mode, write into the shared data is recorded, and even in a critical section, a thread can be stopped while the integrity of data is preserved. These are advantages of the quasi-transaction mode.

The quasi-transaction mode is set with respect to a critical section whose execution as a transaction is relatively unbeneficial. This is because, even if a critical section rarely executed simultaneously by multiple threads is exclusively executed by use of a lock on it, parallelism among the threads is hardly impaired. In addition, a critical section for which rollback processing is frequently performed is also subject to the quasi-transaction mode. This is because a critical section for which rollback processing is frequently performed is considered to involve little or no parallelism among threads.

Figure 3B:
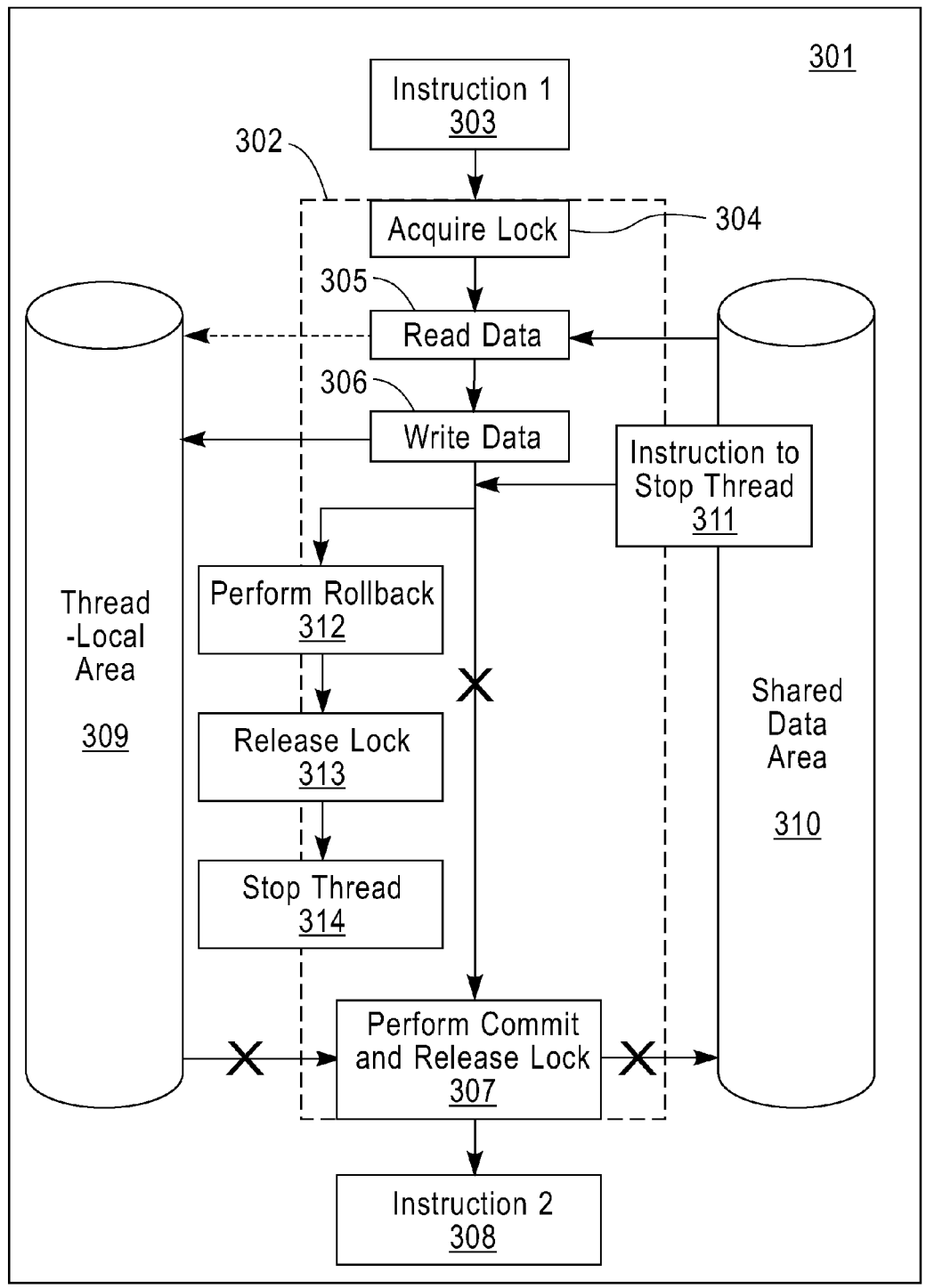
FIG. 3B shows an example of stopping a currently executing thread in the quasi-transaction mode, according to an embodiment of the present invention.

FIG. 3B shows an example for stopping the thread 301 in FIG. 3A which is being executed in the quasi-transaction mode. The stop target thread is provided with a mechanism for picking up an asynchronous event. For example, the same mechanism as Javax.realtime.RealTimeThread.interrupt, which is an existing technique, is used for this mechanism. In this mechanism, the stop target thread has an asynchronous-event flag. This flag can be set also from a thread other than the stop target thread. In the stop target thread, an instruction prepared for the stopping is executed when this flag is set.

The thread 301 is a thread executing in the quasi-transaction mode. The thread 301 is provided with the above mechanism by which an asynchronous event is detected. Below, a description will be given illustrating a case where, in a thread 301, after the Write Data module 306 writes data into shared data, the thread 301 stops without the Perform Commit and Release Lock module 307 executing the perform commit function.

An asynchronous event occurs when the Stop Thread Instruction 311 for stopping the thread 301 is executed in a thread, not shown, while an instruction to stop the thread 301 is also performed. If the asynchronous event is detected in the thread 301 after the Write Data module 306 executes the writing of data into the shared data, the modules, Perform Commit and Release Lock 307 and Instruction module 308 do not execute their functions as they do normally, and modules 312, Perform Rollback, 313, Release Lock, 313, and 314, Stop Thread execute their functions for stopping the thread. In the functioning of Perform Rollback module 312 for performing rollback, a value to be written and an address for accessing an area into which the value is written are discarded, or marked so as not to be used, the value and address having been recorded in the thread-local area 309. In the functioning of Release Lock module 313 for releasing a lock on a critical section, the lock on the critical section, which is acquired before the first instruction in the critical section is started, is released. The thread stops, at Stop Thread module 314, when the lock on the critical section is released.

Here, the value to be written and the address for accessing the area into which the value is written, which have been recorded in the thread-local area 309, are not used by the Write Data module 306 for writing data into the shared data since the Perform Commit and Release Lock module 307 for performing commit does not execute its function. Consequently, data is not written into the shared data area 310.

In the embodiments of the present invention, a value to be written into a shared data area by write processing in a critical section is recorded in a thread-local area. The recorded value is written into the shared data area upon completion of the final instruction in the critical section. The thread can be safely stopped if the stop is before the value is written into the shared data area.

The following is an example of a procedure to safely stop a thread under the transaction mode and the quasi-transaction mode. Steps 1 and 2 are processes specific to the transaction mode. Step 3 is a process common to the transaction mode and the quasi-transaction mode. Additionally, in the following example, a lock on the shared data area is used in order to atomically operate the shared data area. The lock on the shared data area is not a lock for a transaction. The lock on the shared data area is managed by use of, for example, an ownership record table shown in FIG. 3C. Each entry in the table, FIG. 3C, corresponds to a particular shared data area. The first column of this table represents version numbers associated with shared data in the shared data area on which a lock is imposed. The second column of this table represents lock bits. When this bit is 1, a shared data area corresponding to it is locked.

Step 1: A lock on a shared data area of a write destination is acquired. By this acquisition, only a thread having acquired a lock on a corresponding shared data area is allowed to write data into the shared data area.

Step 2: When shared data is read, the version number recorded in a thread-local area is compared with the current version number. By this comparison, whether or not these version numbers match each other is checked. The version numbers are incremented every time data is written into shared data areas corresponding to the version numbers. If all version numbers read from the thread-local area match the current version numbers, the process proceeds to the next step. If they do not match each other, the transaction is rolled back, and a critical section is re-executed.

Step 3: Writing data into a shared data area is started. At the same time, the value of a version number in the table is incremented.

Writing data into shared data is executed in step 3. Consequently, a thread can be stopped when the step 3 is not yet started. In order to stop the thread before the step 3 is started, it is only necessary to check an asynchronous event immediately before step 3.

In the quasi-transaction mode, only one thread executes a critical section having a certain object set as a monitor. Thus, in this mode, the steps 1 and 2 are unnecessary, and only the step 3 is carried out. Consequently, in the quasi-transaction mode, the thread can be stopped to end the critical section until immediately before processing.

Figure 3D:
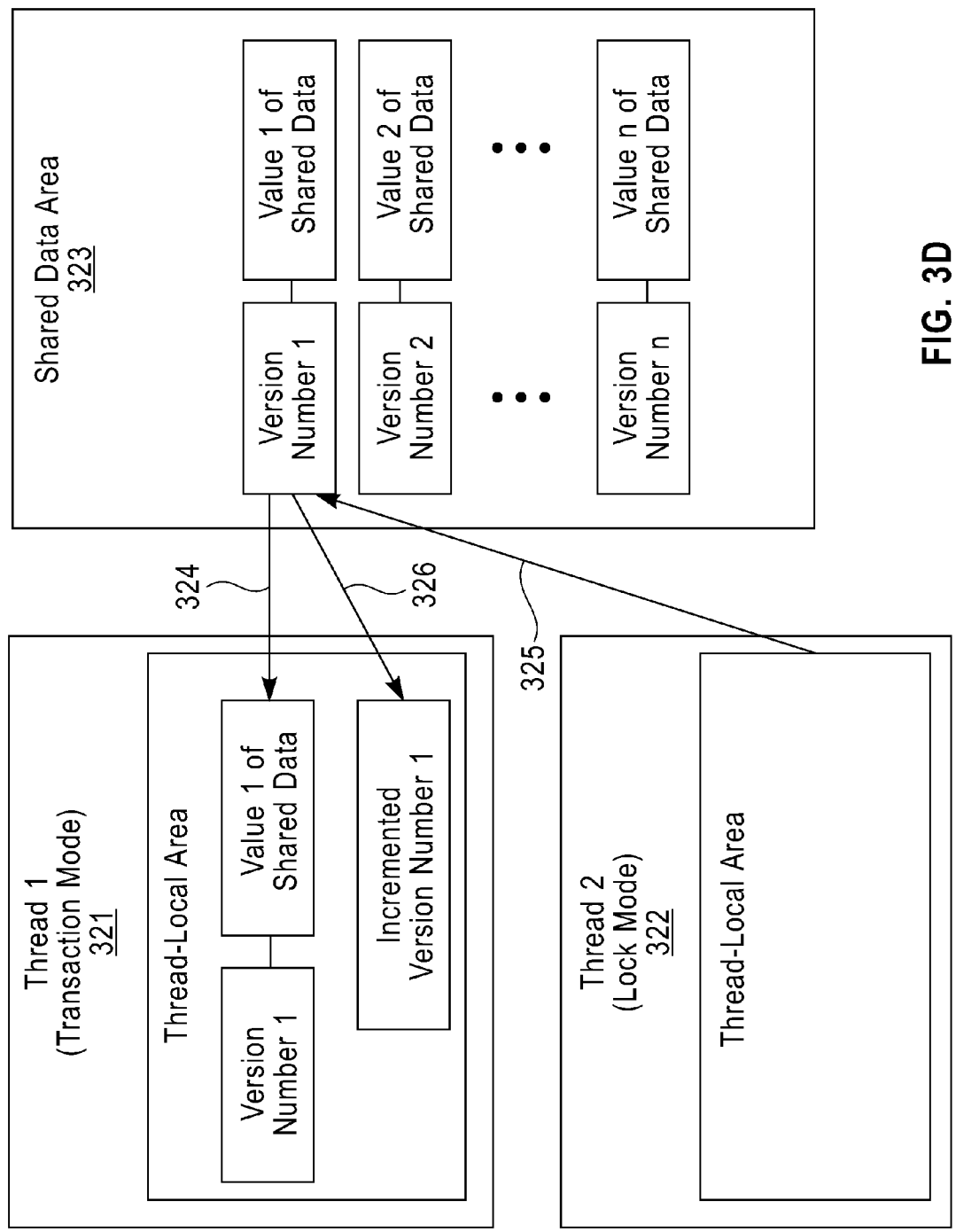
FIG. 3D shows an example of a rolled back thread.

FIG. 3D shows an example of a thread being rolled back. In this example, a thread 1, 321, currently being executed in the transaction mode is rolled back as a result of an update of shared data that is caused by a thread 2, 322, currently executing in the transaction mode.

An instruction to read data from a shared data area 323 is executed in the thread 1, 321, currently being executed in the transaction mode. The version number of the data and the address are stored in the thread-local area in the thread 1.

Suppose that an instruction to write data into the shared data area 323 is executed in the thread 2, 322, currently being executed in the transaction mode. Then, a value of the shared data in the shared data area 323 is updated at the commit time in the thread 2. Additionally, version information associated with the shared data is incremented, step 325.

When a commit instruction is executed in the thread 1, 321, currently being executed in the transaction mode, the incremented version information is read from the shared data area 323, step 326. Subsequently, the incremented version information read is compared with the version information recorded in step 324. The result of this comparison shows that the versions are different from each other, and the thread 1, 321 is rolled back.

Figure 3E:
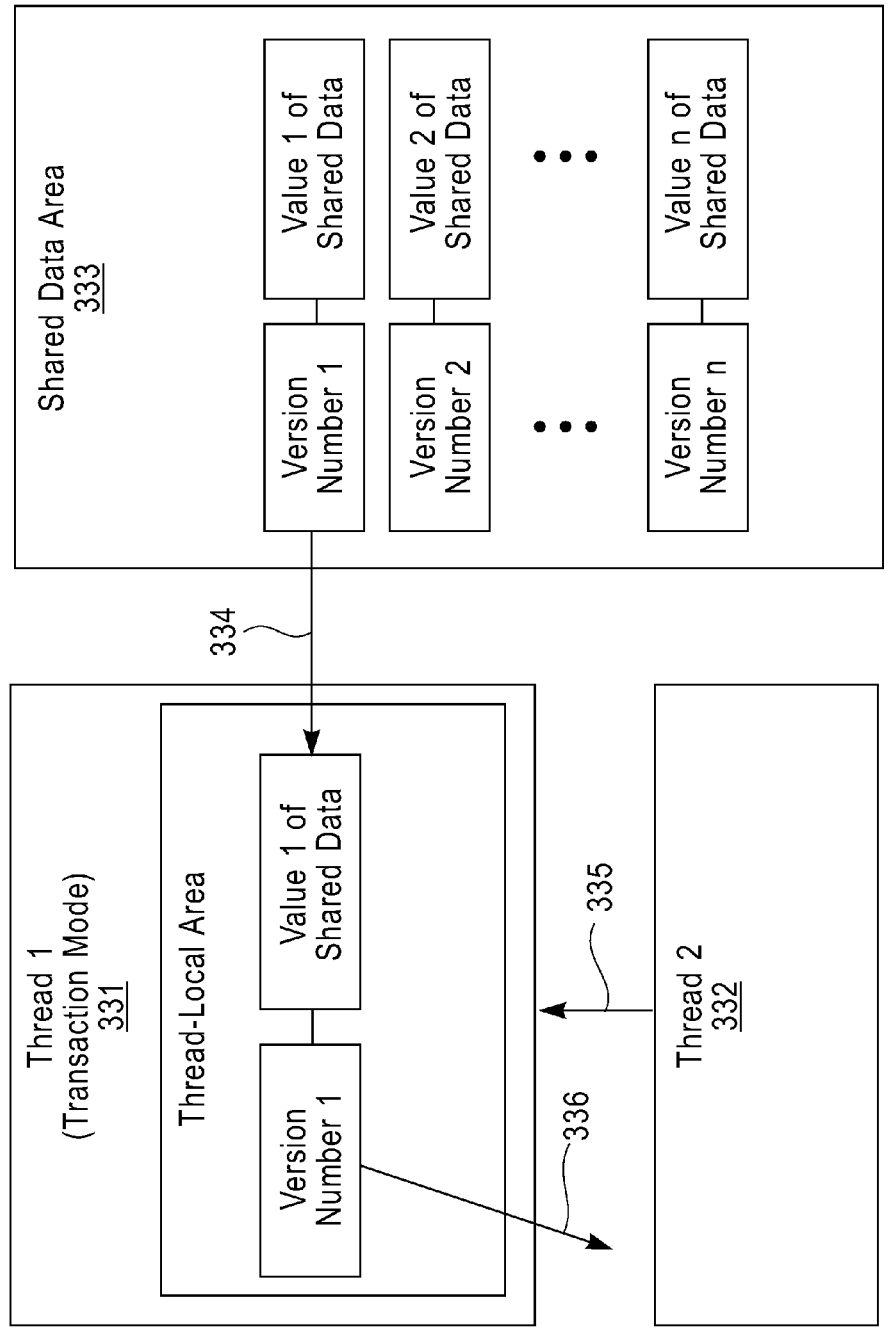
FIG. 3E shows an example of stopping a thread, according to an embodiment of the present invention.

FIG. 3E shows an example of stopping a thread in an embodiment of the present invention. This example is an example where a thread 1, 331, currently being executed in the quasi-transaction mode stops as a result of a stopping event issued from a thread 2, 332.

An instruction to write data into a shared data area 333 is executed in the thread 1, 331, currently executing in the quasi-transaction mode. Values of shared data in the shared data area 333 are not updated directly through the execution of this instruction. Instead, a value to be written and an address for accessing an area into which the value is written are stored in a thread-local area step 334 in the thread 1, 331.

Here, assuming that an asynchronous event for stopping the thread 1, 331, is issued in the thread 2, 322, step 335, the value to be written and the address for accessing an area into which the value is written which have been stored in the thread-local area, are discarded step 336, or marked so as not to be used. Through processing in step 336, the shared data in the shared data area 333 is not updated in the thread 1 331, and the thread 1 331 stops.

Figure 4A:
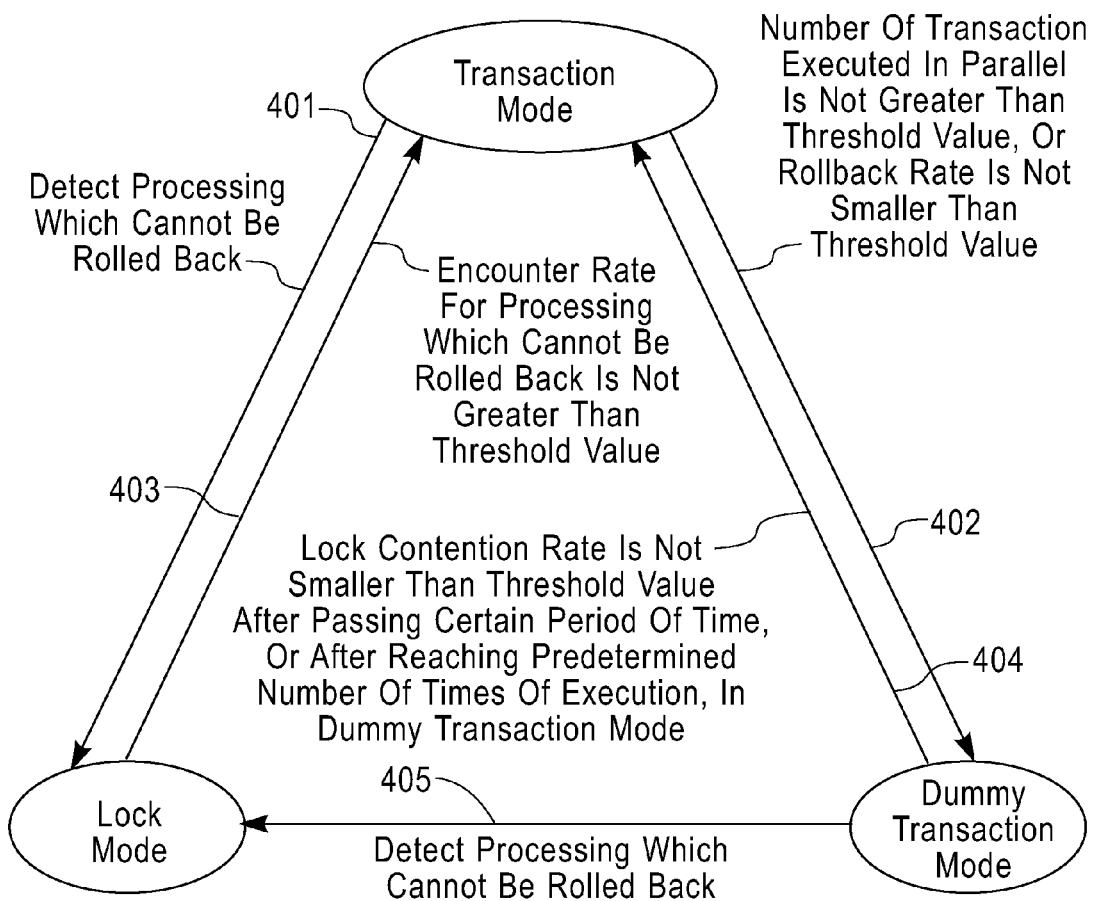
FIG. 4A shows a transition diagram of execution modes, according to an embodiment of the present invention.

FIG. 4A shows a transition diagram of the execution modes of an embodiment of the present invention. In the embodiments of the present invention, each object, including a critical section, transitions among the lock mode, the transaction mode, and the quasi-transaction mode. In order to cause each object to transition among these execution modes, the system determines values of: a lock contention rate; a transaction rollback rate; the number of transactions executed in parallel; and an encounter rate of processing which cannot be rolled back.

The lock contention rate is calculated by dividing the number of lock contentions by the number of times each object is executed in the lock mode. The number of lock contentions is obtained, for example, by counting the number of times each object has been unsuccessful in acquiring a lock on the object. The transaction rollback rate is calculated by dividing the number of transactions for which commit has been unsuccessful, by the total number of transactions.

The number of transactions executed in parallel can be counted, for example, if each object adds 1 to a counter at the start of a transaction, and subtracts 1 from the counter at the end of the transaction. The counter is prepared in a shared data area. Processing which cannot be rolled back means processing on which logging can be performed neither in the transaction mode nor in the quasi-transaction mode. Examples of such processing include standard output processing such as a "java.lang.System.outprintln" function, file input-output processing through the java.io.File class, for example, in Java™ programming.

The encounter rate of processing which cannot be rolled back is calculated, for example, by dividing, the number of times processing which cannot be rolled back has been encountered during execution in the transaction mode, by the number of times execution in the transaction mode has been attempted. A transition from the transaction mode to the lock mode is executed when processing which cannot be rolled back is detected.

A transition from the transaction mode to the quasi-transaction mode is executed when the number of transactions executed in parallel is not greater than a threshold value, or when the transaction rollback rate is not greater than a threshold value. All the above threshold values are set, for example, by an administrator of the system. The administrator of the system determines values appropriate for the threshold values, for example, by measuring throughputs of the system.

Additionally, it is preferred that the threshold value for the number of transactions executed in parallel have an average value not greater than 1. If the average value of the numbers of such transactions is not greater than 1, it is considered highly likely that there are no transactions executed in parallel. Consequently, throughput of the system is expected to be improved if a transaction is caused to transition to the quasi-transaction mode. Additionally, it is preferred that the threshold value for the transaction rollback rate have a value not smaller than 0.5. A frequent occurrence of rollback is highly likely for a transaction in which rollback occurs with a probability of 50 percents or higher. Consequently, the throughput of the system is expected to be improved if the transaction is caused to make a transition to the quasi-transaction mode.

A transition from the lock mode to the transaction mode is executed when the encounter rate with processing which cannot be rolled back is not greater than a threshold value. This threshold value is set, for example, by the administrator of the system. The administrator of the system determines a value appropriate for the threshold value, for example, by measuring the throughput of the system. Additionally, it is preferred that the threshold value be less than 0.1. If the threshold value is less than 0.1, there is a 90 percent or higher probability that a transaction does not encounter processing which cannot be rolled back. Consequently, the throughput of the system is expected to be improved if such a transaction is caused to transition to the transaction mode.

On the other hand, when a transition in the reverse direction from the transaction mode to the lock mode is caused, overhead of the system is substantial. This is because the transition has to wait until the completion of transactions of other threads. Consequently, in order to prevent this from frequently occurring, it is desirable that the above value be set conservatively to a low value.

A reason for causing the transition from the transaction mode to the lock mode is to utilize the parallelism of the transaction mode to enhance performance of an object having a high lock contention rate. The transaction mode allows a critical section to be executed in parallel, thereby having the potential to enhance performance of the system. However, if the rollback rate is high and the performance is not improved even after an object transitions from the lock mode to the transaction mode, the object will further transition to the quasi-transaction mode.

A transition from the quasi-transaction mode to the transaction mode is executed when the lock contention rate is not smaller than a threshold value after a certain period of time has passed, or after the number of instances of execution in quasi-transaction mode has reached a predetermined number since the last transition of a transaction to the quasi-transaction mode. This threshold value is set, for example, by the administrator of the system. The administrator of the system obtains a value appropriate as the threshold value, for example, by measuring the throughput of the system. Additionally, it is recommended that the above value have a value not smaller than 0.5. This is because, if a transaction for which lock contention occurs with a 50 percent or higher probability is caused to transition to the transaction mode, the throughput of the system is expected to be improved.

A transition from the quasi-transaction mode to the transaction mode is executed when processing which cannot be rolled back is detected. A transition from the lock mode to the quasi-transaction mode does not occur in principle. The reason is that the quasi-transaction mode induces lock contention as the lock mode does. As long as the lock contention rate is high, performance of the system remains unchanged even if a transaction transitions from the lock mode to the quasi-transaction mode.

As a method of implementing a technique for switching between the modes, the following two methods can be considered. Note that logging code in the following descriptions is program code indicating processing for recording write or read of shared data in a thread-local area.

The first method is one for identifying the execution mode in each logging code. This method allows the quantity of code to be reduced as compared to the second method. However, overhead is generated at the execution of a component corresponding to each logging code. The second method is one in which versions in accordance with the respective execution modes are assigned to a program code component of each critical section.

In each of the above two methods, codes for a lock version, a transaction version and a quasi-transaction version are generated for each program code component in a critical section. The code for the lock version is one having no logging code. The code for the transaction version is one into which logging code is inserted. The code for the quasi-transaction mode is one obtained by excluding a logging code at the time of reading shared data from the code for the transaction version. The second method can achieve a higher execution rate than the first method. However, the second method requires a larger quantity of code.

FIG. 4B shows, as an embodiment of the present invention, execution modes allowed in an inner or internal critical section for each of the execution modes in an outer or external critical section, in a case where these critical sections are nested.

When the outer critical section is in the lock mode, all the execution modes are allowable in the inner critical section. However, the following check and counter are necessary for a critical section recursive to the same object. The above check is a check as to whether a lock on an object is retained by the object itself at the start of the inner critical section. The counter is a counter indicating that recursive acquisition has been made.

When the outer critical section is in the transaction mode, the lock mode and the quasi-transaction mode are unallowable in the inner critical section. One of the reasons for this is that, if the inner critical section is executed in the lock mode, it becomes impossible to roll back all processing for the outer critical section. Another reason is that, if the inner critical section is executed in the quasi-transaction mode, it becomes impossible to analyze a collision because, as a record on read is omitted, the system cannot find access to the same data at the time of commit of a transaction in the outer critical section.

When the outer critical section is in the quasi-transaction mode, the lock mode is unallowable in the inner critical section. The reason for this is that, if a thread is stopped while the quasi-transaction mode is active, execution of the inner critical section cannot be rolled back.

In the embodiments of the present invention, the system is taken to be a closed-nesting transactional memory scheme system. Consequently, results of write of a transaction and a quasi-transaction in the inner critical section are reflected at the time of commit of a transaction and a quasi-transaction in the outer critical section, respectively. That is, results of writing of the transaction and the quasi-transaction in the inner critical section are invisible to other threads until execution of commit of the transaction in the outer critical section.

Figure 5A:
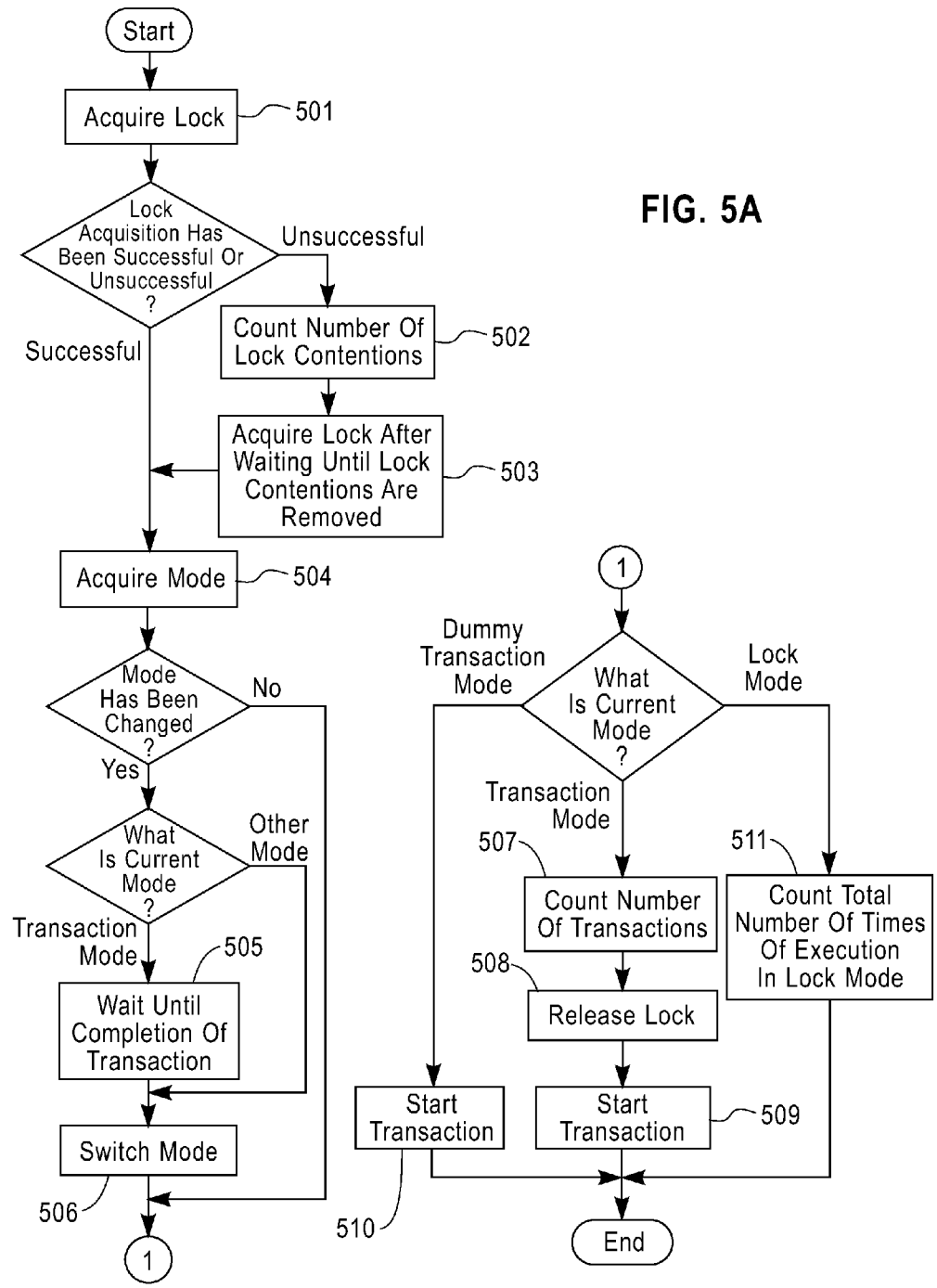
FIG. 5A shows a flow chart for processing executed before the first instruction in a critical section is started, according to an embodiment of the present invention.
Figure 5B:
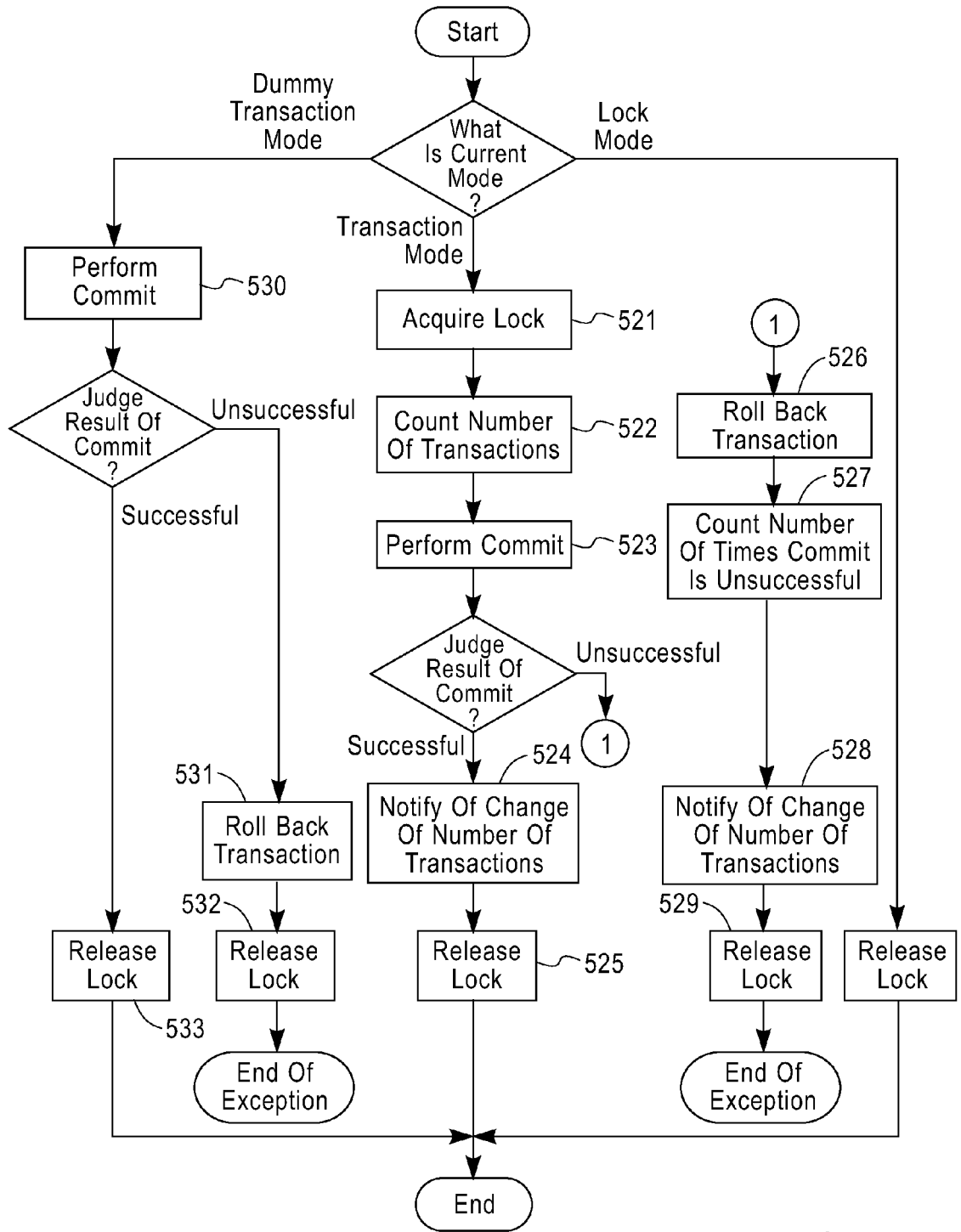
FIG. 5B shows a flow chart of processing executed after the final instruction in a critical section is completed, according to an embodiment of the present invention.
Figure 5C:
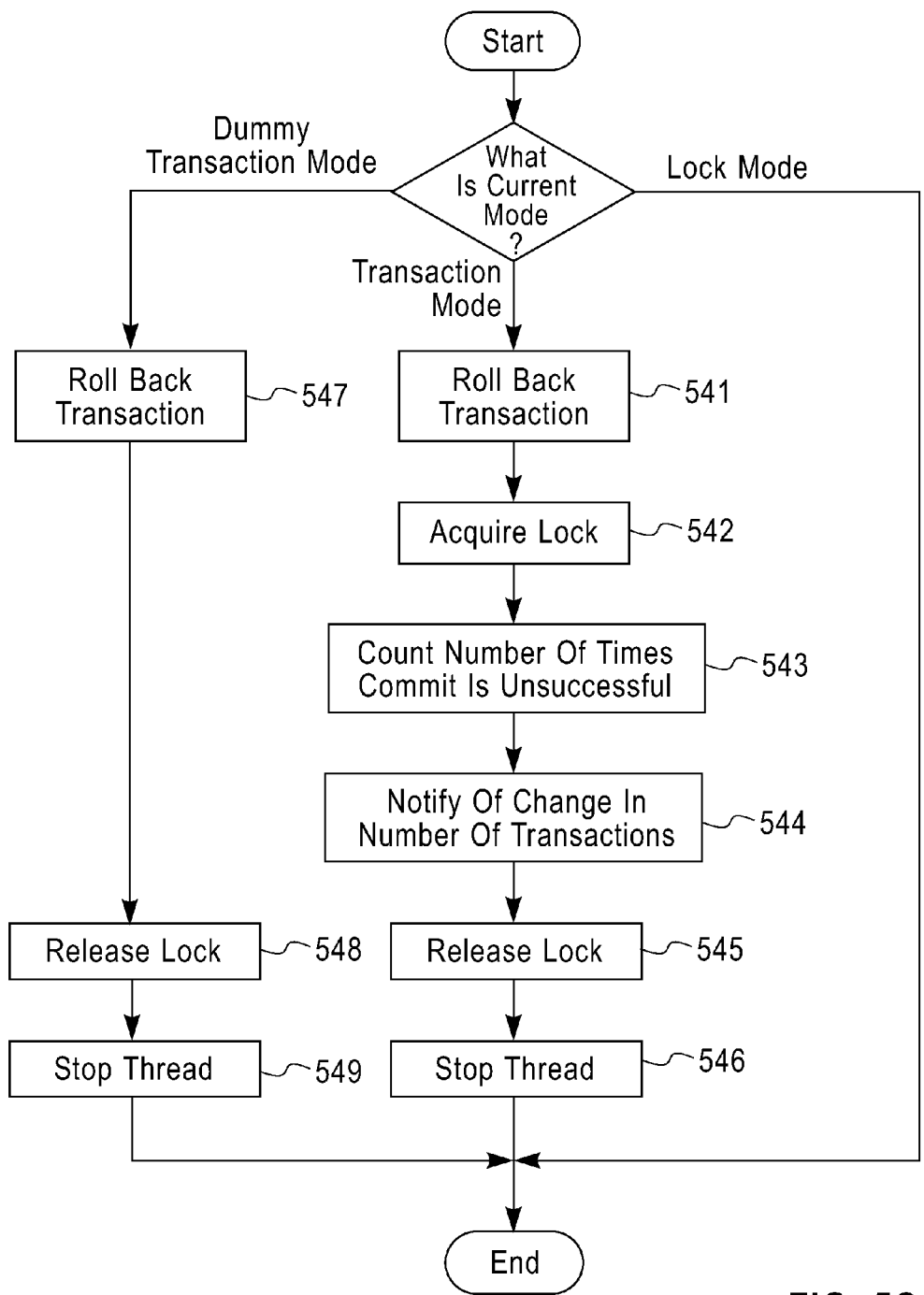
FIG. 5C shows a flow chart of processing executed in a case where a thread stops upon acceptance of an asynchronous event during execution of an instruction in a critical section, according to an embodiment of the present invention.

FIGS. 5A to 5C show flow charts of processing for transitions of the execution modes according to the embodiments of the present invention. The processing for transitions of the execution modes is executed in an object generated from a code including a critical section. Here, it is assumed that an object for monitoring the ending of transactions is executed apart from the object generated from the code including the critical section. The object for monitoring the ending of transactions manages the number of transactions executed in parallel.

FIG. 5A shows a flow chart of processing executed before the first instruction in a critical section is started, according to an embodiment of the present invention.

In the flow chart, first a lock on a monitor object which is an object generated from a code including the critical section is acquired in step 501. The lock on the monitor object is a lock for exclusively handling a variable used in that monitor object, and is not a lock on the critical section at the time of its acquisition. After access to the variable is ended, the lock on the monitor object is inherited as a lock on the critical section in each of the lock mode and the quasi-transaction mode. On the other hand, the lock on the critical section is unnecessary in the transaction mode. Consequently, in the transaction mode, the lock on the monitor object is released within the process before a transaction is started in the transaction mode after access to the variable is ended in step 508.

When the acquisition of the lock on the monitor object is fails, the number of lock contentions is counted, step 502. This counting is performed, for example, by incrementing the number of locks. Then, after waiting until lock contentions are removed, the lock on the monitor object is acquired in step 503.

Once the lock on the monitor object is acquired, any one of the three execution modes is acquired, step 504. In processing for this acquisition, whether or not to cause a mode transition is determined by using statistical data and the threshold values for the transition of respective execution modes that are described in the explanation of FIG. 4A. Then, which mode to acquire is determined. The statistical data here are: the number of transactions for which commit is unsuccessful; the total number of transactions in which the object has been executed as a monitor object; the total number of transactions executed in parallel; the total number of times the object has been executed in the lock mode; the number of times processing which cannot be rolled back is encountered; and the number of lock contentions. The above statistical data do not require accurate values, and therefore are not required to be atomically updated.

Subsequently, it is decided whether there is a change in the acquired execution mode compared to an execution mode being active before the start of the first instruction in the critical section. If there is a change, and the current execution mode is the transaction mode, the processing waits until the end of all transactions with respect to the monitor object currently operating in the transaction mode, step 505. The reason for this is to prevent a critical section using a particular monitor object from being executed by multiple threads in different modes. The mode is switched after transactions are ended for the monitor object, step 506.

Processing like that in step 505 is not required if the execution mode acquired in step 504 is any one of the lock mode and the quasi-transaction mode, and the change of the execution mode is to the transaction mode from any one of the lock mode and the quasi-transaction mode. The reason for this is that a critical section using this object as a monitor will not be executed in multiple threads in the lock mode and in the quasi-transaction mode. Once the execution mode is determined, the following processing according to the execution mode is executed.

If the execution mode is the transaction mode, the number of currently active transactions is counted to be added to the total number of transactions executed in parallel step 507. Subsequently, the lock is released since a lock is not required at the execution of a transaction in the transaction mode, step 508. Subsequently, the transaction is started in the transaction mode, and processing for the critical section is performed, step 509.

If the execution mode is the quasi-transaction mode, a transaction in the quasi-transaction mode is started while the lock on the monitor object is retained, and then processing for the critical section is performed, step 510. Consequently, in the quasi-transaction mode, processing of a critical section is performed with the lock on the critical section retained.

If the execution mode is the lock mode, the total number of times the monitor object has been executed in the lock mode is counted, step 511. Then, processing for the critical section is started while the lock on the monitor object is retained. Consequently, in the lock mode, processing of a critical section is performed while a lock on the critical section is retained.

FIG. 5B shows a flow chart of processing executed after the final instruction in a critical section is completed, according to an embodiment of the present invention. Different processing is executed in each mode in this flow chart.

If the execution mode is the transaction mode, acquisition of a lock on a monitor object is executed in order to update the number of transactions for which commit is unsuccessful, and the number of currently active transactions. The numbers are variables that must be atomically updated, step 521. Once the lock on the monitor object is acquired, the number of currently active transactions is counted, for example, decremented in step 522. Then, commit for a transaction is executed step 523. If the commit is successful, an object for monitoring the ending of transactions is notified of a change in number of currently active transactions, step 524.

Finally, the lock on the monitor object is released, step 525. If the commit is unsuccessful, the transaction is rolled back, step 526. The number of transactions for which commit is unsuccessful is counted, for example, incremented in step 527. Additionally, the object for monitoring the ending of transactions is notified of a change in the number of currently active transactions step 528. Finally, the lock on the monitor object is released, step 529. The critical section may also be re-executed. Alternatively, a thread may be stopped. Also, alternatively, unique processing for ending an exception may be performed.

If the execution mode is the quasi-transaction mode, commit for a transaction is performed first at step 530. Subsequently, a result of the commit is judged. The commit normally turns out to be successful. The reason for this is that shared data accessed by an instruction of a currently executed critical section in the quasi-transaction mode is protected because the shared data is not changed by other threads. However, when a protection on the shared data is not perfect as the result of a bug in a program, there is a possibility that the commit is unsuccessful. For example, commit may fail in a program in which access to the same shared data occurs within a critical section using different objects as monitors.

In the example in FIG. 5B, a transaction is rolled back when the commit is unsuccessful, step 531. Subsequently, the lock on the critical section is released, step 532. Then, the critical section is re-executed. At this point, a bug in a program can be reported and the thread is stopped. When the commit is successful, the lock on the critical section is released, step 533. If the execution mode is the lock mode, the lock on the critical section is released, step 534.

FIG. 5C shows a flow chart of processing executed in a case where a thread stops in response to an asynchronous event during execution of an instruction in a critical section according to an embodiment of the present invention.

If the execution mode is the transaction mode, processing for rolling back a transaction is performed, step 541. Subsequently, in order to update the variables necessary to be atomically updated, a lock on a monitor object is acquired, step 542. Once the lock on the monitor object is acquired, the number of currently active transactions is counted, for example, decremented in step 543. Subsequently, an object for monitoring the ending of transactions is notified of a change in the number of currently active transactions, step 544. Finally, the lock on the monitor object is released, step 545. Then, the thread stops step 546.

If the execution mode is the quasi-transaction mode, processing for rolling back a transaction is performed in step 547. Subsequently, the lock on the critical section is released, step 548. Then, the thread stops, step 549. If the execution mode is the lock mode, the thread is not stopped.

FIGS. 5D to 5G show examples of embodiments of programs for causing the execution modes to transition according to the embodiments of the present invention. In these examples, a synchronized block is used as a critical section with Java™ language, for example.

FIG. 5D shows an example of a data structure of a monitor object needed by a Java™ execution environment, according to an embodiment of the present invention.

An execution mode in each monitor object is declared to be a constant. In this declaration, the lock mode, the transaction mode and the quasi-transaction mode are represented as LOCK_MODE, TM_MODE and DUMMY_TM_MODE, respectively.

A "mutex" is an object variable for providing a lock function to an object. In the program, acquisition of a lock on an object is executed by use of this object. "noActiveTx" is an object variable for monitoring the ending of transactions. In the program, reporting on and waiting for the ending of a transaction are executed by use of this object.

A "mode" is a variable by which the execution mode for each object is set. An initial value for this variable is set to TM_MODE. Consequently, the execution mode for each object is initialized to be the transaction mode. That is, a synchronized block using a certain object as a monitor is executed in the transaction mode at the beginning.

An "activeTxCount" is a variable for counting the number of currently active transactions. This variable is incremented when the transaction mode is started, and is decremented when the transaction mode is interrupted or ended.

An "abortedTxCount" is a variable for counting the number of transactions for which commit is unsuccessful. This variable is incremented when commit is unsuccessful in an object.

A "totalTxCount" is a variable for counting the total number of transactions in which the object has been executed as a monitor. This variable is incremented at the start of the transaction mode.

A "parallelTxCount" is a variable for counting the total number of transactions executed in parallel. The number of currently active transactions is added to this variable at the start of the transaction mode.

A "totalLockCount" is a variable for counting the total number of times an object is executed in the lock mode. This variable is incremented at the start of the lock mode.

An "unrevocableCount" is a variable for counting the number of times processing which cannot be rolled back is encountered during execution of a synchronized block. This variable is incremented when processing which cannot be rolled back is encountered in the transaction mode or the quasi-transaction mode.

A "lockContentionCount" is a variable for counting the number of lock contentions. This variable is incremented when acquisition of a lock on an object is failed.

The above variables "abortedTxCount", "totalTxCount", "parallelTxCount", "totalLockCount", "unrevocableCount" and "lockContentionCount" are utilized for selection of the execution modes. Examples of mode transitions using the variables are shown below.

A transition from the transaction mode to the quasi-transaction mode 402 in FIG. 4A is performed if either of the following two conditions is satisfied: a rollback rate abortedTxCount/totalTxCount of a transaction is not smaller than a certain threshold value; and the average number of parallel transactions parallelTxCount/totalTxCount is not greater than a certain threshold value.

A transition from the lock mode to the transaction mode 403 in FIG. 4A is performed on condition that an encounter rate with processing which cannot be rolled back is not greater than a certain threshold value. The encounter rate with processing which cannot be rolled back is determined by the following expression:

Encounter rate with processing which cannot be rolled back=unrevocableCount/totalTxCount.

A transition from the quasi-transaction mode to the transaction mode 404 in FIG. 4A is performed on condition that a lock contention rate is not smaller than a certain threshold value after a certain period of time has passed, or after the number of execution times in the quasi-transaction mode has reached a predetermined number since the last transition of the execution mode to the quasi-transaction mode. The lock contention rate is calculated by the following equation:

Lock contention rate=lockContentionCount/totalLockCount.

The period of time depends on the system. This period of time can be, for example, 600 seconds since the last mode transition to the quasi-transaction mode. The predetermined number may be configured so that the lock contention rate is calculated, for example, every time the number of execution instances in the quasi-transaction mode reaches 1000.

A transition from the transaction mode or the quasi-transaction mode to the lock mode, 401 or 405 in FIG. 4A, is performed on condition that processing such as JNI Java Native Interface, which cannot be rolled back, is detected. In this transition, the transaction is rolled back, and then, after the execution mode of a monitor object makes a transition to the lock mode, a synchronized block is re-executed from the beginning.

Each of the above mode transitions is implemented as a method represented as "selectMode" in the following description. It is a possible that transitions between the transaction mode and the quasi-transaction mode frequently occurs in a synchronized block for which the rollback rate of transactions and the lock contention rate are concurrently high. As one method for decreasing the frequency of these transitions, a method in which the threshold value relating to the lock contention rate is increased in accordance with a frequency of transition from the quasi-transaction mode to the transaction mode can be used.

As an example of this method, a new threshold value is set by adding to the latest threshold value relating to the lock contention rate, a value obtained by dividing the number of instances of the transition by 100. A ceiling is set for the new threshold value so that it does not to exceed 1. In another method, the transition is controlled by multiplying the lock contention rate by a coefficient dependent on the frequency of the transition from the quasi-transaction mode to the transaction mode. For example, 1 is given as an initial value for this coefficient. The coefficient is set to a value greater than 0 and less than 1. It becomes closer to 0 every time the transition is made from the quasi-transaction mode to the transaction mode.

FIG. 5E shows an example of a program for processing executed before the first instruction in a critical section is started. This program is an example where the flow chart shown in FIG. 5A is written in Java™. In the program, an argument "mustBeChangedIntoLockMode" is a flag for forcing a transition to the lock mode. For this argument, "true" is set when a synchronized block is re-executed in a thread having processing detected which cannot be rolled back. According to this setting, a transition to the lock mode is forced.

In the program, variables required to be exclusively handled are three variables the lock variable mutex, the execution mode, and the currently active transactions activeTxCount. These three variables are exclusively handled by a lock on a monitor object.

Here, after the above three variables are consolidated into a comprehensive variable, the comprehensive variable is updated by use of an atomic operation instruction such as CAS compare-and-swap. If this method is used, acquisition of a lock on the object is not necessarily required. An example of this method is shown below.

The above single variable obtained by the consolidation is, for example, a 32-bit variable. In this 32-bit variable, the upper 16 bits correspond to an area for managing a lock on the variable, the middle 12 bits correspond to an area for storing the number of currently active transactions, and the lower 4 bits correspond to an area for storing the execution mode.

Additionally, a value for the lower 4 bits is set to 0. When a critical section for which a value of this 32-bit variable is 0x00000050 in hexadecimal is executed, this variable is atomically updated to 0x00000060. That is, the number of executed transactions is increased by 1. It is preferable that a variable such as this be contained in the header of an object.

However, it is likely that there is no free space in the header. Consequently, in implementation, a pointer to the data is retained in a header of an object, for example, in a fat lock mode.

In the above program, the method "selectMode" is a method for implementing mode transition. In this method, by using the statistical data abortedTxCount, totalTxCount, parallelTxCount, totalLockCount, unrevocableCount and lockContentionCount and the respective threshold values described in the explanation on FIG. 4A, whether or not to cause a mode transition is determined, and the execution mode is determined.

FIG. 5F shows an example of a program for processing executed after the final instruction in a critical section is completed. This program is an example where the flow chart shown in FIG. 5B is written in Java™. In the program for processing executed after the final instruction in the critical section is completed, a lock on a monitor object is acquired in the transaction mode. This acquired lock is a lock for exclusively handling the number of transactions for which commit has failed, abortedTxCount, and the number of currently active transactions, activeTxCount. The acquired lock is not a lock for exclusively handling a critical section. The acquired lock is released in the program for the processing executed after the final instruction in the critical section is completed.

In the quasi-transaction mode and the lock mode, processing of a synchronized block is performed with a lock on a monitor object, which has been obtained in step 501 in FIG. 5A. The lock is simply released after the final instruction is completed.

FIG. 5G shows an example of a program for processing in a case where a thread stops upon acceptance of an asynchronous event during execution of an instruction in a critical section. This program is an example where the flow chart shown in FIG. 5C is written in Java™. This is the same processing as Javax.realtime.RealTimeThread.interrupt, which is an existing technique. In this processing, a flag indicating the occurrence of an asynchronous-event is set on the thread targeted to be stopped.

As a result of checking for an asynchronous event by each thread, this processing is called by the stop target thread itself. Additionally, it is necessary that this processing be called in connection with a monitor object. Consequently, the monitor object subjected to this processing is registered in the thread at the start of a synchronized block. The synchronous event is utilized in many Java™ execution environments.

In the above program, for a case where a thread stops, a lock on the monitor object is acquired in the transaction mode. This acquired lock is a lock for exclusively handling the number of currently active transactions, activeTxCount. The acquired lock is not a lock for exclusively handling a critical section. Consequently, this acquired lock is released in the program for processing for a case where a thread stops.

On the other hand, in the quasi-transaction mode, the lock on the monitor object acquired in step 501 in FIG. 5A is simply released in the program for processing for a case where a thread stops. In the lock mode, no thread can be stopped, and the lock on the monitor object acquired in step 501 in FIG. 5A remains.

In the embodiment of the present invention, a critical section is executed in a mode referred to as the quasi-transaction mode in the description. In the quasi-transaction mode, it is possible to stop a locked thread. Additionally, in the quasi-transaction mode, it is possible to return shared data to its state preceding execution of the critical section. Furthermore, in the quasi-transaction mode, overhead of logging processing is reduced as compared to the case where a critical section is executed in the transaction mode.

In the embodiments of the present invention, additionally, a quasi-transaction scheme, an exclusive control scheme, and a transaction scheme are used as the execution modes. By effectively switching these execution modes, it becomes possible to stop as many threads executing a critical section as is possible.

Figure 6:
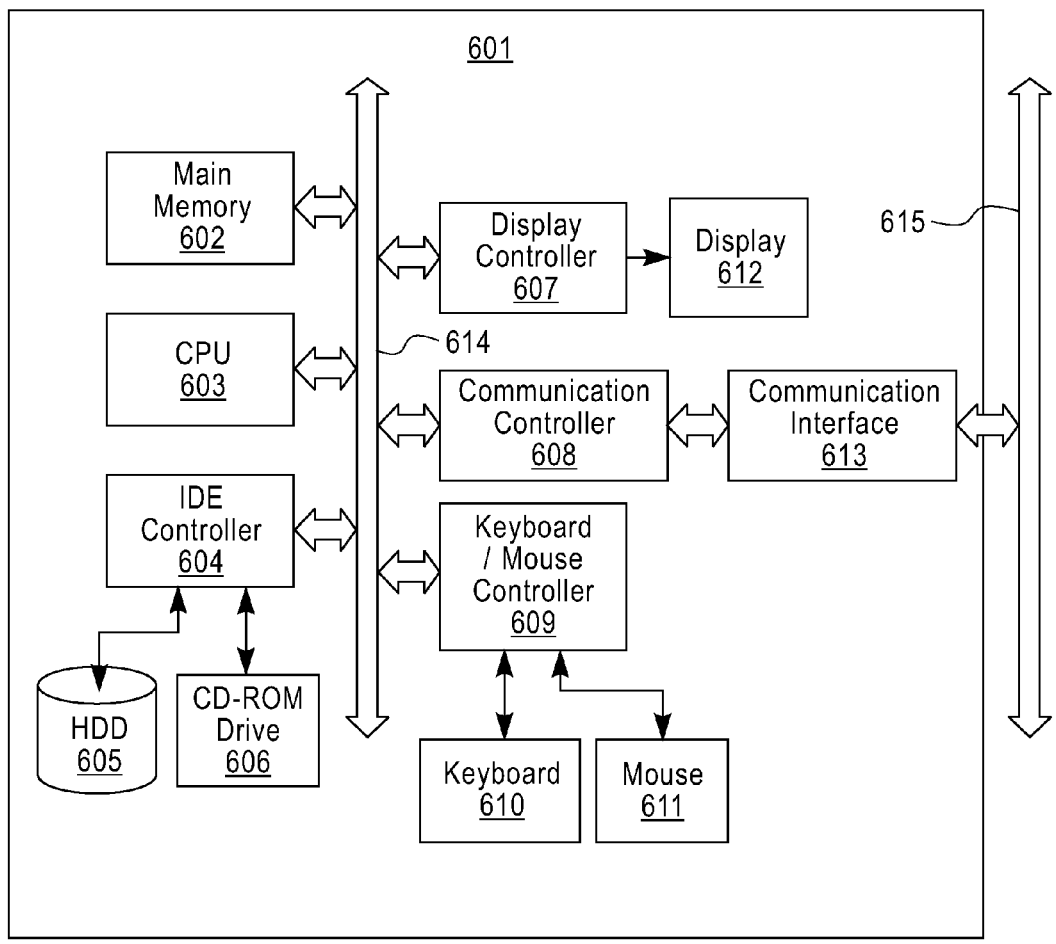
FIG. 6 shows a block diagram of computer hardware according to an embodiment of the present invention.

FIG. 6 shows a block diagram of a computing device according to an embodiment of the present invention. The computer system 601 includes a CPU 603 and a main memory 602, which are connected to a bus 614. The CPU 603 can be based on 32-bit or 64-bit architecture, and the CPU can be of the Xeon™ series, the Core™ series, the ATOM™ series, the Pentium™ series and the Celeron™ series of the Intel Corp., as well as the Phenom™ series and the Athlon™ series of AMD. A display 612 such as an LCD monitor is connected through a display controller 607 to the bus 614. In order to manage the computer system, the display 612 is used for displaying, through a suitable graphic interface, information on the computer and information on software currently operating on the computer. The computer can be connected to a network through a communication line 615. A hard disk or silicon disk 605, a CD-ROM, DVD, or BD drive 606 are also connected through an IDE or SATA controller 604 to the bus 614.

An operating system, a program such as J2EE which provides a Java™ execution environment, and other programs and data are stored In the hard disk in a form loadable into a main memory. The CD-ROM, DVD or BD drive 606 is used for additionally installing a program from a CD-ROM, DVD or BD into the hard disk when needed. A keyboard 610 and a mouse 611 are connected through a keyboard/mouse controller 609 to the bus 614.

A communication interface 613 complies with, for example, an Ethernet™ protocol, and is connected to the bus 614 through a communication controller 608. The communication interface 613 serves to connect the computer and the communication line 615 to each other, and provides a network interface layer to a TCP/IP communication protocol of a communication function of an operating system for the computer. The communication line may be configured as a wired LAN, or a wireless LAN based on a wireless LAN connection standard such as IEEE 802.11a/b/g/n, for example.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of causing transitions among modes by a computing device for allowing exclusive access to shared data in order to allow stopping of a program including a code for execution in a critical section and an instruction to write a value into or read a value from a shared data area in a memory, the method comprising at least one of the steps of:

causing a transition from a transaction mode to a quasi-transaction mode, the transition from the transaction mode to the quasi-transaction mode being caused in response to a number of transactions executed in parallel becoming smaller than a threshold value, or in response to a rate of cancelling the transactions becoming greater than a threshold value;

causing a transition from the quasi-transaction mode to a lock mode; and causing a transition from the quasi-transaction mode to the transaction mode, wherein the lock mode is a mode for executing a critical section by using a lock, the transaction mode is a mode for executing a critical section by using a transactional memory scheme, and the quasi-transaction mode is a mode for executing a critical section by executing the steps of:

acquiring, by an acquire lock module, a lock on the critical section before start of a first instruction in the critical section;

writing, by a write data module, a value into a thread-local area in the memory in response to a write instruction to write the value into the shared data area in the critical section; writing, by the write data module, into the shared data area, the value written into the thread-local area, upon completion of a final instruction in the critical section; and releasing, by a release lock module, the lock on the critical section, thereby causing transitions among modes for allowing exclusive access to shared data in order to allow stopping of the program including the code for execution in the critical section and the instruction to write the value into or read the value from the shared data area in the memory.

2. The method according to claim 1, wherein the transition from the quasi-transaction mode to the transaction mode is caused in response to a lock contention rate becoming greater than a threshold value after a certain period of time has passed, or after the number of execution instances in the quasi-transaction mode has reached a predetermined number since the last mode transition.

3. The method according to claim 1, wherein the transition from the quasi-transaction mode to the lock mode is caused upon detection of a process in which a transaction cannot be rolled back.

4. The method according to claim 1, wherein the step of causing the transition from the quasi-transaction mode to the transaction mode includes a step of increasing a threshold value for a lock contention rate in according to a frequency of the transition from the quasi-transaction mode to the transaction mode.

5. The method according to claim 1, wherein the step of causing the transition from the quasi-transaction mode to the transaction mode further includes a step of changing a lock contention rate by multiplying the lock contention rate by a coefficient according to a frequency of the transition from the quasi-transaction mode to the transaction mode.

6. The method according to claim 1, further comprising the step of causing, by a thread currently executing in the quasi-transaction mode, an asynchronous event for another thread to stop the currently executing thread.

7. The method according to claim 1, further comprising the step of causing a transition from the lock mode to the transaction mode.

8. The method according to claim 1, further comprising the step of causing a transition from the transaction mode to the lock mode.

9. The method according to claim 7, wherein the transition from the lock mode to the transaction mode is caused in response to an encounter rate for processing which cannot be rolled back being smaller than a threshold value.

10. The method according to claim 8, wherein the transition from the transaction mode to the lock mode is caused upon detection of processing in which a transaction cannot be rolled back.

11. The method according to claim 1, further comprising the step of starting processing of an asynchronous event upon acceptance of the asynchronous event while an instruction in a critical section is executed in the transaction mode.

12. The method according to claim 11, wherein the step of starting processing of an asynchronous event further includes a step of stopping a thread upon completion of the processing of the asynchronous event.

13. The method according to claim 1, further comprising the steps of: consolidating a variable for managing a lock, a variable for managing the modes and a variable for managing the number of currently active transactions into a comprehensive variable; and updating the comprehensive variable by using an atomic operation instruction.

14. A non-transitory computer readable article of manufacture tangibly embodying computer readable instructions which, when executed, cause a computer device to implement the method of causing transitions among modes by a computing device for allowing exclusive access to shared data in order to allow stopping of a program including a code for execution in a critical section and an instruction to write a value into or read a value from a shared data area in a memory, the method comprising at least one of the steps of:

causing a transition from a transaction mode to a quasi-transaction mode, the transition from the transaction mode to the quasi-transaction mode being caused in response to a number of transactions executed in parallel becoming smaller than a threshold value, or in response to a rate of cancelling the transactions becoming greater than a threshold value;

causing a transition from the quasi-transaction mode to a lock mode; and causing a transition from the quasi-transaction mode to the transaction mode, wherein the lock mode is a mode for executing a critical section by using a lock, the transaction mode is a mode for executing a critical section by using a transactional memory scheme, and the quasi-transaction mode is a mode for executing a critical section by executing the steps of:

acquiring, by an acquire lock module, a lock on the critical section before start of a first instruction in the critical section;

writing, by a write data module, a value into a thread-local area in the memory in response to a write instruction to write the value into the shared data area in the critical section;

writing, by the write data module, into the shared data area, the value written into the thread-local area, upon completion of a final instruction in the critical section; and releasing, by a release lock module, the lock on the critical section, thereby causing transitions among modes for allowing exclusive access to shared data in order to allow stopping of the program including the code for execution in the critical section and the instruction to write the value into or read the value from the shared data area in the memory.

* * * * *